(12) United States Patent
Chan et al.

(10) Patent No.: US 10,230,636 B2
(45) Date of Patent: Mar. 12, 2019

(54) SOFTWARE INTERFACE LAYER OF A MESH NETWORK DEVICE

(71) Applicant: AMAZON TECHNOLOGIES, INC., Seattle, WA (US)

(72) Inventors: Sheung Mei Chan, Santa Clara, CA (US); Andrew David Price, Santa Clara, CA (US); Varadarajan Gopalakrishnan, Cupertino, CA (US); Yi Zhu, San Jose, CA (US); Lori Yoshida, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 191 days.

(21) Appl. No.: 15/188,841

(22) Filed: Jun. 21, 2016

(65) Prior Publication Data

US 2017/0366458 A1 Dec. 21, 2017

(51) Int. Cl.
*H04W 40/24* (2009.01)
*H04L 12/741* (2013.01)
*H04L 29/12* (2006.01)
*H04W 40/02* (2009.01)
*H04L 12/755* (2013.01)

(52) U.S. Cl.
CPC .......... *H04L 45/745* (2013.01); *H04L 45/021* (2013.01); *H04L 61/6022* (2013.01); *H04W 40/02* (2013.01)

(58) Field of Classification Search
CPC ..... H04W 84/18; H04W 40/02; H04W 40/24; H04W 40/12; H04W 88/04; H04W 88/06; H04W 84/12; H04W 8/005; H04W 40/246; H04L 41/12; H04L 45/02; H04L 45/00; H04L 45/302; H04L 45/124; H04L 47/14

See application file for complete search history.

(56) References Cited

U.S. PATENT DOCUMENTS 7,756,009 B1 * 7/2010 De Boer ................... H04J 3/14
370/216
8,208,373 B2 * 6/2012 Bonta ..................... H04L 45/22
370/228

(Continued)

OTHER PUBLICATIONS

International Search Report and Written Opinion dated Sep. 20, 2017, on application No. PCT/US2017/033664.

(Continued)

*Primary Examiner* — Sai Aung
(74) *Attorney, Agent, or Firm* — Lowenstein Sandler LLP

(57) ABSTRACT

Network hardware devices organized in a wireless mesh network (WMN) in which one network hardware devices includes a first radio and a second radio coupled to a processing device. The processing device receives a request from a client consumption device via the first radio and determines a destination for the request as a second mesh network device. The processing device access a master routing table to determine that the second radio is to forward the request and forwards the request to the second radio. The second radio accesses a local routing table at the second radio to determine that a radio of a third mesh network device is a next-hop mesh network device in a first path to the second mesh network device. The second radio sends the request to the radio of the third mesh network device.

20 Claims, 10 Drawing Sheets

(56) References Cited

U.S. PATENT DOCUMENTS

| | | | |
|---|---|---|---|
| 2003/0223359 A1* | 12/2003 | Einstein | H04L 45/00 370/228 |
| 2007/0121558 A1 | 5/2007 | Beach et al. | |
| 2008/0317047 A1* | 12/2008 | Zeng | H04L 45/00 370/401 |
| 2009/0041039 A1* | 2/2009 | Bear | H04L 45/38 370/401 |
| 2009/0232026 A1* | 9/2009 | Lu | H04L 45/125 370/254 |
| 2010/0157889 A1 | 6/2010 | Aggarwal et al. | |
| 2010/0303005 A1* | 12/2010 | Gossain | H04L 45/124 370/328 |
| 2015/0195187 A1* | 7/2015 | Savolainen | H04W 40/02 370/401 |
| 2016/0373997 A1* | 12/2016 | Petersen | H04W 40/12 |

OTHER PUBLICATIONS

"A Multi-Radio Unification Protocol for IEEE 802.11 Wireless Networks" Atul Adya et al., Jul. 2003, Technical Report MSR-TR-2003-44.

* cited by examiner

SOFTWARE INTERFACE LAYER OF A MESH NETWORK DEVICE

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices or user equipment) are electronic book readers, cellular telephones, personal digital assistants (PDAs), portable media players, tablet computers, netbooks, laptops and the like. These electronic devices wirelessly communicate with a communications infrastructure to enable the consumption of the digital media items. In order to wirelessly communicate with other devices, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
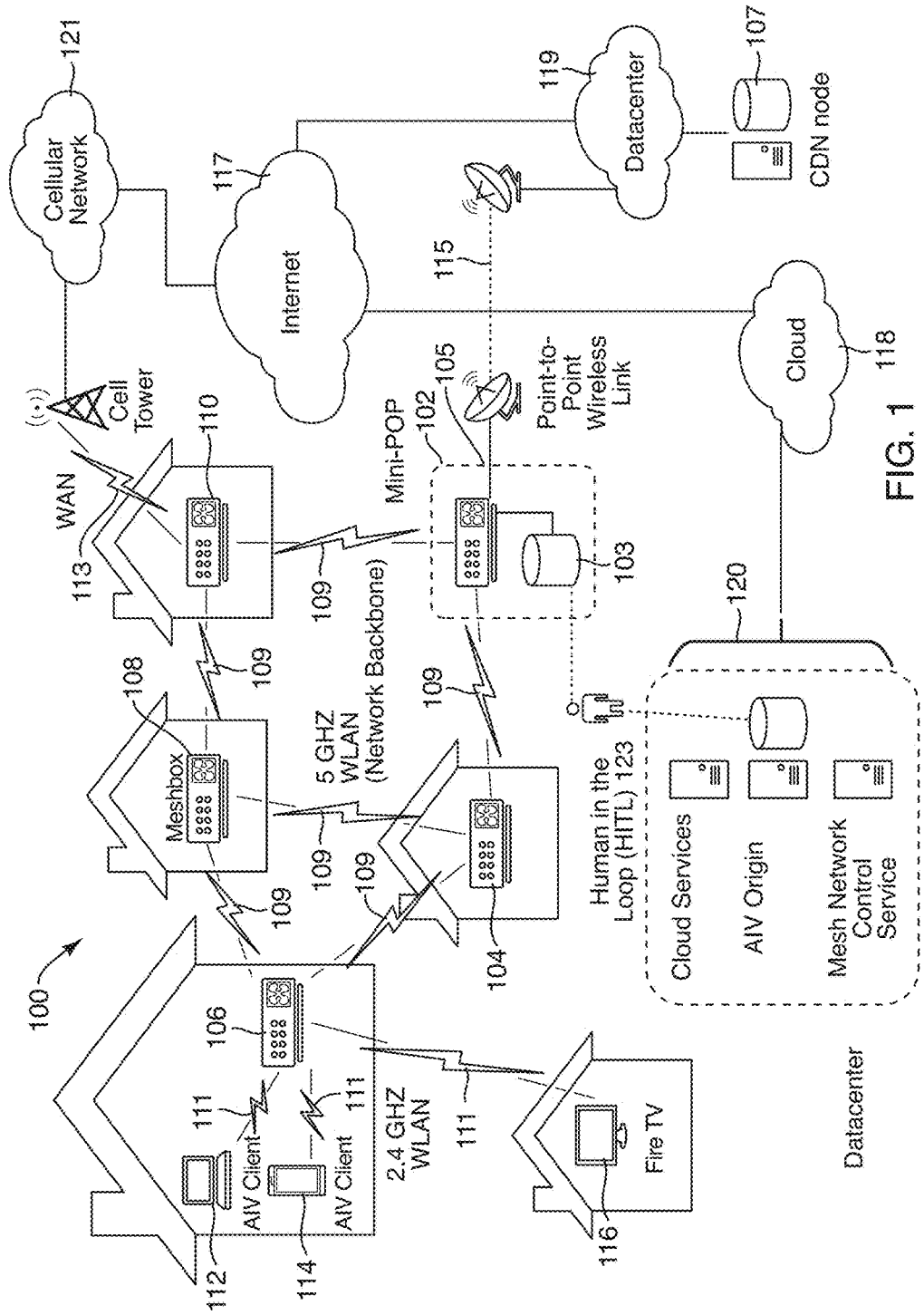
FIG. 1 is a network diagram of network hardware devices organized in a wireless mesh network (WMN) for content distribution to client devices in an environment of limited connectivity to broadband Internet infrastructure according to one embodiment.

A wireless mesh network (WMN) containing multiple mesh network devices, organized in a mesh topology, is described. The mesh network devices in the WMN cooperate in distribution of content files to client consumption devices in an environment of limited connectivity to broadband Internet infrastructure. The embodiments described herein may be implemented where there is the lack, or slow rollout, of suitable broadband Internet infrastructure in developing nations, for example. These mesh networks can be used in the interim before broadband Internet infrastructure becomes widely available in those developing nations.

Described herein are embodiments directed to path discovery and routing data traffic over a network backbone of a WMN using a media access control (MAC) Unification Layer (MUL) of a mesh network device. The MUL may be a software interface layer between the IP layer and MAC layer of the OSI software layers. The MUL can abstract the underlying hardware to high level software and can operate a bridge between a data stack of an operating system and the underlying radios. This bridge can be used to route data between the data stack and one of the radios and route data from one radio to another radio. In some cases, a processing device of a mesh network device includes a first radio and a second radio coupled to a processing device. The processing device receives a request from a client consumption device via the first radio and determines a destination for the request as a second mesh network device. The processing device access a master routing table to determine that the second radio is to forward the request and forwards the request to the second radio. The second radio accesses a local routing table at the second radio to determine that a radio of a third mesh network device is a next-hop mesh network device in a first path to the second mesh network device. The second radio sends the request to the radio of the third mesh network device.

One system of devices organized in a WMN includes a first network hardware device having at least one of a point-to-point wireless link to access content files over the Internet or a wired connection to access the content files stored on a storage device coupled to the first network hardware device. The network hardware devices are also referred to herein as mesh routers, mesh network devices, mesh nodes, Meshboxes, or Meshbox nodes. Multiple network hardware devices wirelessly are connected through a network backbone formed by multiple peer-to-peer (P2P) wireless connections (i.e., wireless connections between multiple pairs of the network hardware devices). The multiple network devices are wirelessly connected to one or more client consumption devices by node-to-client (N2C) wireless connections. The multiple network devices are wirelessly connected to a mesh network control service (MNCS) device by cellular connections. The content file (or generally a content item or object) may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), or multi-media content. The client consumption devices may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

The embodiments of the mesh network devices may be used to deliver content, such as video, music, literature, or the like, to users who do not have access to broadband Internet connections because the mesh network devices may be deployed in an environment of limited connectivity to broadband Internet infrastructure. In some of the embodiments described herein, the mesh network architecture does not include "gateway" nodes that are capable of forwarding broadband mesh traffic to the Internet. The mesh network architecture may include a limited number of point-ofpresence (POP) nodes that do have access to the Internet, but the majority of mesh network devices is capable of forwarding broadband mesh traffic between the mesh network devices for delivering content to client consumption devices that would otherwise not have broadband connections to the Internet. Alternatively, instead of POP node having access to broadband Internet infrastructure, the POP node is coupled to storage devices that store the available content for the WMN. The WMN may be self-contained in the sense that content lives in, travels through, and is consumed by nodes in the mesh network. In some embodiments, the mesh network architecture includes a large number of mesh nodes, called Meshbox nodes. From a hardware perspective, the Meshbox node functions much like an enterprise-class router with the added capability of supporting P2P connections to form a network backbone of the WMN. From a software perspective, the Meshbox nodes provide much of the capability of a standard content distribution network (CDN), but in a localized manner. The WMN can be deployed in a geographical area in which broadband Internet is limited. The WMN can scale to support a geographic area based on the number of mesh network devices, and the corresponding distances for successful communications over WLAN channels by those mesh network devices.

Although various embodiments herein are directed to content delivery, such as for the Amazon Instant Video (AIV) service, the WMNs, and corresponding mesh network devices, can be used as a platform suitable for delivering high bandwidth content in any application where low latency is not critical or access patterns are predictable. The embodiments described herein are compatible with existing content delivery technologies, and may leverage architectural solutions, such as CDN surfaces like the Amazon AWS CloudFront service. Amazon CloudFront CDN is a global CDN service that integrates with other Amazon Web services products to distribute content to end users with low latency and high data transfer speeds. The embodiments described herein can be an extension to this global CDN, but in environments where there is limited broadband Internet infrastructure. The embodiments described herein may provide users in these environments with a content delivery experience equivalent to what the users would receive on a traditional broadband Internet connection. The embodiments described herein may be used to optimize deployment for traffic types (e.g. streaming video) that are increasingly becoming a significant percentage of broadband traffic and taxing existing infrastructure in a way that is not sustainable.

Figure 8:
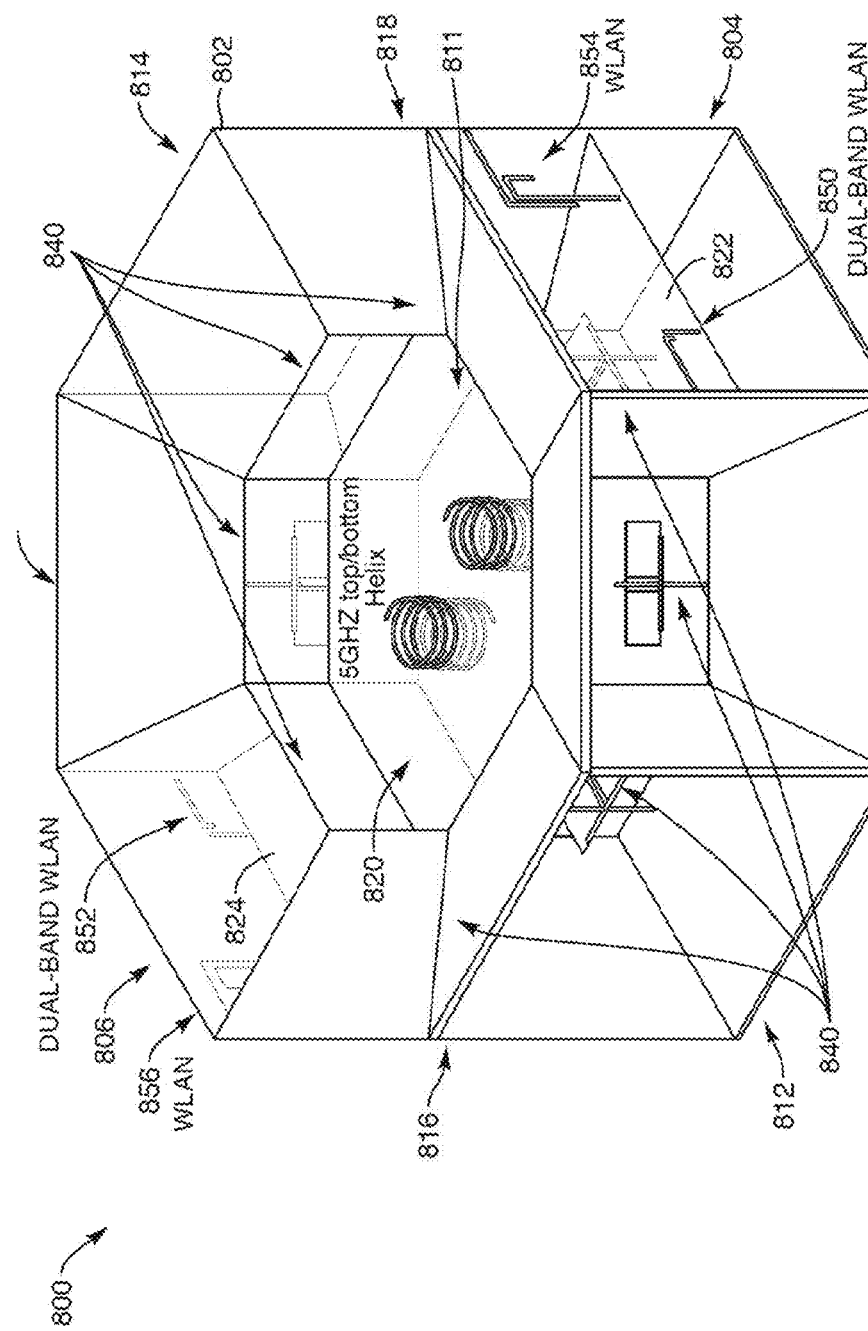
FIG. 8 illustrates a multi-radio, multi-channel (MRMC) network device according to one embodiment.
Figure 9:
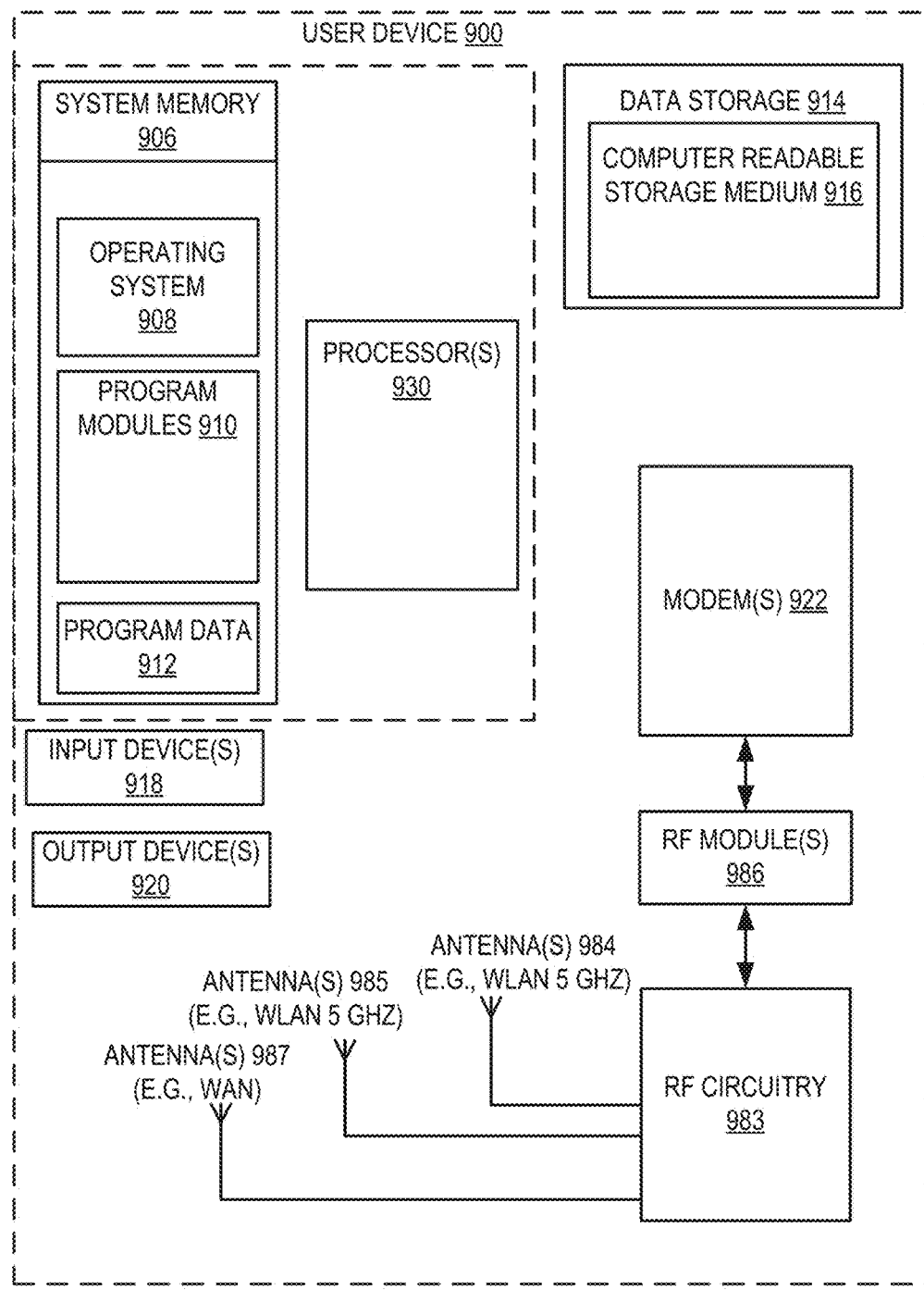
FIG. 9 is a block diagram of a network hardware device according to one embodiment.

FIGS. 1-4 are generally directed to network hardware devices, organized in a wireless mesh network, for content distribution to client consumption devices in environments of limited connectivity to broadband internet infrastructure. The embodiments described herein may be deployed in these network hardware devices. FIGS. 5-7B are generally directed to routing traffic on a network backbone of the WMN of mesh network devices. FIGS. 8-9 are generally directed to multi-radio, multi-channel (MRMC) mesh network devices that may implement various embodiments described herein.

FIG. 1 is a network diagram of network hardware devices 102-110, organized in a wireless mesh network (WMN) 100, for content distribution to client devices in an environment of limited connectivity to broadband Internet infrastructure according to one embodiment. The WMN 100 includes multiple network hardware devices 102-110 that connect together to transfer digital content through the WMN 100 to be delivered to one or more client consumption devices connected to the WMN 100. In the depicted embodiment, the WMN 100 includes a miniature point-of-presence (mini-POP) device 102 (also referred to as mini-POP device), having at least one of a first wired connection to an attached storage device 103 or a point-to-point wireless connection 105 to a CDN device 107 (server of a CDN or a CDN node) of an Internet Service Provider (ISP). The CDN device 107 may be a POP device (also referred to as a POP device), an edge server, a content server device or another device of the CDN. The mini-POP device 102 may be similar to POP devices of a CDN in operation. However, the mini-POP device 102 is called a miniature to differentiate it from a POP device of a CDN given the nature of the mini-POP device 102 being a single ingress point to the WMN 100; whereas, the POP device of a CDN may be one of many in the CDN.

The point-to-point wireless connection 105 may be established over a point-to-point wireless link 115 between the mini-POP device 102 and the CDN device 107. Alternatively, the point-to-point wireless connection 105 may be established over a directional microwave link between the mini-POP device 102 and the CDN device 107. In other embodiments, the mini-POP device 102 is a single ingress node of the WMN 100 for the content files stored in the WMN 100. Meaning the mini-POP 102 may be the only node in the WMN 100 having access to the attached storage or a communication channel to retrieve content files stored outside of the WMN 100. In other embodiments, multiple mini-POP devices may be deployed in the WMN 100, but the number of mini-POP devices should be much smaller than a total number of network hardware devices in the WMN 100. Although a point-to-point wireless connection can be used, in other embodiments, other communication channels may be used. For example, a microwave communication channel may be used to exchange data. Other long distance communication channels may be used, such as a fiber-optic link, satellite link, cellular link, or the like. The network hardware devices of the WMN 100 may not have direct access to the mini-POP device 102, but can use one or more intervening nodes to get content from the mini-POP device. The intervening nodes may also cache content that can be accessed by other nodes. The network hardware devices may also determine a shortest possible route between the requesting node and a node where a particular content file is stored.

The CDN device 107 may be located at a datacenter 119 and may be connected to the Internet 117. The CDN device 107 may be one of many devices in the global CDN and may implement the Amazon CloudFront technology. The CDN device 107 and the datacenter 119 may be co-located with the equipment of the point-to-point wireless link 155. The point-to-point wireless connection 105 can be considered a broadband connection for the WMN 100. In some cases, the mini-POP device 102 does not have an Internet connection via the point-to-point wireless connection 105 and the content is stored only in the attached storage device 103 for a self-contained WMN 100.

The WMN 100 also includes multiple mesh nodes 104-110 (also referred to herein as meshbox nodes and network hardware devices). The mesh nodes 104-110 may establish multiple P2P wireless connections 109 between mesh nodes 104-110 to form a network backbone. It should be noted that only some of the possible P2P wireless connections 109 are shown between the mesh nodes 104-110 in FIG. 1. In particular, a first mesh node 104 is wirelessly coupled to the mini-POP device 102 via a first P2P wireless connection 109, as well as being wirelessly coupled to a second mesh node 106 via a second P2P wireless connection 109 and a third mesh node 108 via a third P2P wireless connection. The mesh nodes 104-110 (and the mini-POP device 102) are MRMC mesh network devices. As described herein, the mesh nodes 104-110 do not necessarily have reliable access to the CDN device 107. The mesh nodes 104-110 (and the mini-POP device 102) wirelessly communicate with other nodes via the network backbone via a first set of WLAN channels reserved for inter-node communications. The mesh nodes 102-110 communicate data with one another via the first set of WLAN channels at a first frequency of approximately 5 GHz (e.g., 5 GHz band of the Wi-Fi® network technologies).

Each of the mesh nodes 104-110 (and the mini-POP device 102) also includes multiple node-to-client (N2C) wireless connections 111 to wirelessly communicate with one or more client consumption devices via a second set of WLAN channels reserved for serving content files to client consumption devices connected to the WMN 100. In particular, the second mesh node 106 is wirelessly coupled to a first client consumption device 112 (AIV client) via a first N2C wireless connection 111, a second client consumption device 114 (AIV client) via a second N2C wireless connection 111, and a third client consumption device 116 (e.g., the Fire TV device) via a third N2C wireless connection 111. The second node 106 wirelessly communicates with the client consumption devices via the second set of WLAN channels at a second frequency of approximately 2.4 GHz (e.g., 2.4 GHz band of the Wi-Fi® network technologies).

Each of the mesh nodes 104-110 (and the mini-POP device 102) also includes a cellular connection 113 to wirelessly communicate control data between the respective node and a second device 118 hosting a mesh network control service described below. The cellular connection 113 may be a low bandwidth, high availability connection to the Internet 117 provided by a cellular network. The cellular connection 113 may have a lower bandwidth than the point-to-point wireless connection 105. There may be many uses for this connection including, health monitoring of the mesh nodes, collecting network statistics of the mesh nodes, configuring the mesh nodes, and providing client access to other services. In particular, the mesh node 110 connects to a cellular network 121 via the cellular connection 113. The cellular network 121 is coupled to the second device 118 via the Internet 117. The second device 118 may be one of a collection of devices organized as a cloud computing system that that hosts one or more services 120. The services 120 may include cloud services to control setup of the mesh nodes, the content delivery service (e.g., AIV origin), as well as other cloud services. The mesh network control service can be one or more cloud services. The cloud services can include a metric collector service, a health and status service, a link selection service, a channel selection service, a content request aggregation service, or the like. There may be APIs for each of these services. Although this cellular connection may provide access to the Internet 117, the amount of traffic that goes through this connection should be minimized, since it may be a relatively costly link. This cellular connection 113 may be used to communicate various control data to configure the mesh network for content delivery. In addition, the cellular connection 113 can provide a global view of the state of the WMN 100 remotely. Also, the cellular connection 113 may aid in the debugging and optimization of the WMN 100. In other embodiments, other low bandwidth services may also be offered through this link (e.g. email, shopping on Amazon.com, or the like).

Although only four mesh nodes 104-110 are illustrated in FIG. 1, the WMN 100 can use many mesh nodes, wireless connected together in a mesh network, to move content through the WMN 100. The 5 GHz WLAN channels are reserved for inter-node communications (i.e., the network backbone). Theoretically, there is no limit to the number of links a given Meshbox node can have to its neighbor nodes. However, practical considerations, including memory, routing complexity, physical radio resources, and link bandwidth requirements, may place a limit on the number of links maintained to neighboring mesh nodes. Meshbox nodes may function as traditional access points (APs) for devices running AIV client software. The 2.4 GHz WLAN channels are reserved for serving client consumption devices. The 2.4 GHz band may be chosen for serving clients because there is a wider device adoption and support for this band. Additionally, the bandwidth requirements for serving client consumption devices will be lower than that of the network backbone. The number of clients that each Meshbox node can support depends on a number of factors including memory, bandwidth requirements of the client, incoming bandwidth that the Meshbox node can support, and the like. For example, the Meshbox nodes provide coverage to users who subscribe to the content delivery service and consume that service through an AIV client on the client consumption devices (e.g., a mobile phone, a set top box, a tablet, or the like). It should be noted that there is a 1-to-many relationship between Meshbox nodes and households (not just between nodes and clients). This means the service can be provided without necessarily requiring a customer to have a Meshbox node located in their house, as illustrated in FIG. 1. As illustrated, the second mesh node 106 services two client consumption devices 112, 114 (e.g., AIV clients) located in a first house, as well as a third client consumption device 116 (e.g., the Fire TV client) located in a second house. The Meshbox nodes can be located in various structures, and there can be multiple Meshbox nodes in a single structure.

The WMN 100 may be used to address two main challenges: moving high bandwidth content to users and storing that content in the network itself. The first challenge may be addressed in hardware through the radio links between mesh nodes and the radio links between mesh nodes and client consumption devices, and in software by the routing protocols used to decide where to push traffic and link and channel management used to configure the WMN 100. The second challenge may be addressed by borrowing from the existing content distribution strategy employed by the content delivery services (e.g., AIV) using caches of content close to the user. The architecture to support content caching is known as a CDN. An example CDN implementation is the AWS CloudFront service. The AWS CloudFront service may include several point-of-presence (POP) racks that are co-located in datacenters that see a lot of customer traffic (for example an ISP), such as illustrated in datacenter 119 in FIG. 1. A POP rack has server devices to handle incoming client requests and storage devices to cache content for these requests. If the content is present in the POP rack, the content is served to the client consumption device from there. If it is not stored in the POP rack, a cache miss is triggered and the content is fetched from the next level of cache, culminating in the "origin," which is a central repository for all available content. In contrast, as illustrated in FIG. 1, the WMN 100 includes the mini-POP device 102 that is designed to handle smaller amounts of traffic than a typical POP rack. Architecturally, the mini-POP device 102 may be designed as a Meshbox node with storage attached (e.g. external hard disk). The mini-POP device 102 may function identically to a POP device with the exception of how cache misses are handled. Because of the lack of broadband Internet infrastructure, the mini-POP device 102 has no traditional Internet connection to the next level of cache. The following describes two different solutions for providing the next level of cache to the mini-POP device 102.

In one embodiment, the mini-POP device 102 is coupled to an existing CDN device 107 via a directional microwave link or other point-to-point wireless link 115. A directional microwave link is a fairly easy way to get a relatively high bandwidth connection between two points. However, line of sight is required which might not be possible with terrain or building constraints. In another embodiment, the mini-POP device 102 can operate with a human in the loop (HITL) to update the cache contents. HITL implies that a person will be tasked with manually swapping out the hard drives with a hard drives with the updated content or adding the content to the hard drive. This solution may be a relatively high bandwidth but extremely high latency solution and may only be suitable if the use cases allow longer times (e.g., hours) to service a cache miss.

The WMN 100 may be considered a multi-radio multi-channel (MRMC) mesh network. MRMC mesh networks are an evolution of traditional single radio WMNs and a leading contender for combatting the radio resource contention that has plagued single radio WMNs and prevents them from scaling to any significant size. The WMN 100 has multiple devices, each with multi-radio multi-channel (MRMC) radios. The multiple radios for P2P connections and N2C connections of the mesh network devices allow the WMN 100 to be scaled to a significant size, such as 10,000 mesh nodes. For example, unlike the conventional solutions that could not effectively scale, the embodiments described herein can be very large scale, such as a 100×100 grid of nodes with 12-15 hops between nodes to serve content to client consumption devices. The paths to fetch content files may not be a linear path within the mesh network.

The WMN 100 can provide adequate bandwidth, especially node-to-node bandwidth. For video, content delivery services recommend a minimum of 900 Kbps for standard definition content and 3.5 Mbps for high definition content. The WMN 100 can provide higher bandwidths than those recommended for standard definition and high definition content. Prior solutions found that for a 10,000-node mesh network covering one square kilometer, the upper bound on inter-node traffic is 221 kbps. The following can impact bandwidth: forwarding traffic, wireless contention (MAC/PHY), and routing protocols.

In some embodiments, the WMN 100 can be self-contained as described herein. The WMN 100 may be self-contained in the sense that content resides in, travels through, and is consumed by nodes in the mesh network without requiring the content to be fetched outside of the WMN 100. In other embodiments, the WMN 100 can have mechanisms for content injection and distribution. One or more of the services 120 can manage the setup of content injection and distribution. These services (e.g., labeled mesh network control service) can be hosted by as cloud services, such as on one or more content delivery service devices. These mechanisms can be used for injecting content into the network as new content is created or as user viewing preferences change. Although these injection mechanisms may not inject the content in real time, the content can be injected into the WMN 100 via the point-to-point wireless connection 105 or the HITL process at the mini-POP device 102. Availability and impact on cost in terms of storage may be relevant factors in determining which content is to be injected into the WMN 100 and which content is to remain in the WMN 100. A challenge for traditional mesh network architectures is that this content is high bandwidth (in the case of video) and so the gateway nodes that connect the mesh to the larger Internet must be also be high bandwidth. However, taking a closer look at the use case reveals that this content, although high bandwidth, does not need to be low latency. The embodiments of the WMN 100 described herein can provide distribution of content that is high bandwidth, but in a manner that does not need low latency.

In some embodiments, prior to consumption by a node having an AIV client itself or being wirelessly connected to an AIV client executing on a client consumption device, the content may be pulled close to that node. This may involve either predicting when content will be consumed to proactively move it closer (referred to as caching) or always having it close (referred to as replication). Content replication is conceptually straightforward, but may impact storage requirements and requires apriori knowledge on the popularity of given titles.

Another consideration is where and how to store content in the WMN 100. The WMN 100 can provide some fault tolerance so that a single mesh node becoming unavailable for failure or reboot has minimal impact on availability of content to other users. This means that a single mesh node is not the sole provider of a piece of content. The WMN 100 can use reliability and availability mechanisms and techniques to determine where and how to store content in the WMN 100.

The WMN 100 can be deployed in an unpredictable environment. Radio conditions may not be constant and sudden losses of power may occur. The WMN 100 is designed to be robust to temporary failures of individual nodes. The WMN 100 can be designed to identify those failures and adapt to these failures once identified. Additionally, the WMN 100 can include mechanisms to provide secure storage of the content that resides within the WMN 100 and prevent unauthorized access to that content.

The cloud services 120 of the WMN 100 can include mechanisms to deal with mesh nodes that become unavailable, adding, removing, or modifying existing mesh nodes in the WMN 100. The cloud services 120 may also include mechanisms for remote health and management. For example, there may be a remote health interface, a management interface, or both to access the mesh nodes for this purpose. The cloud services 120 can also include mechanisms for securing the WMN 100 and the content that resides in the WMN 100. For example, the cloud services 120 can control device access, DRM, and node authentication.

Figure 2:
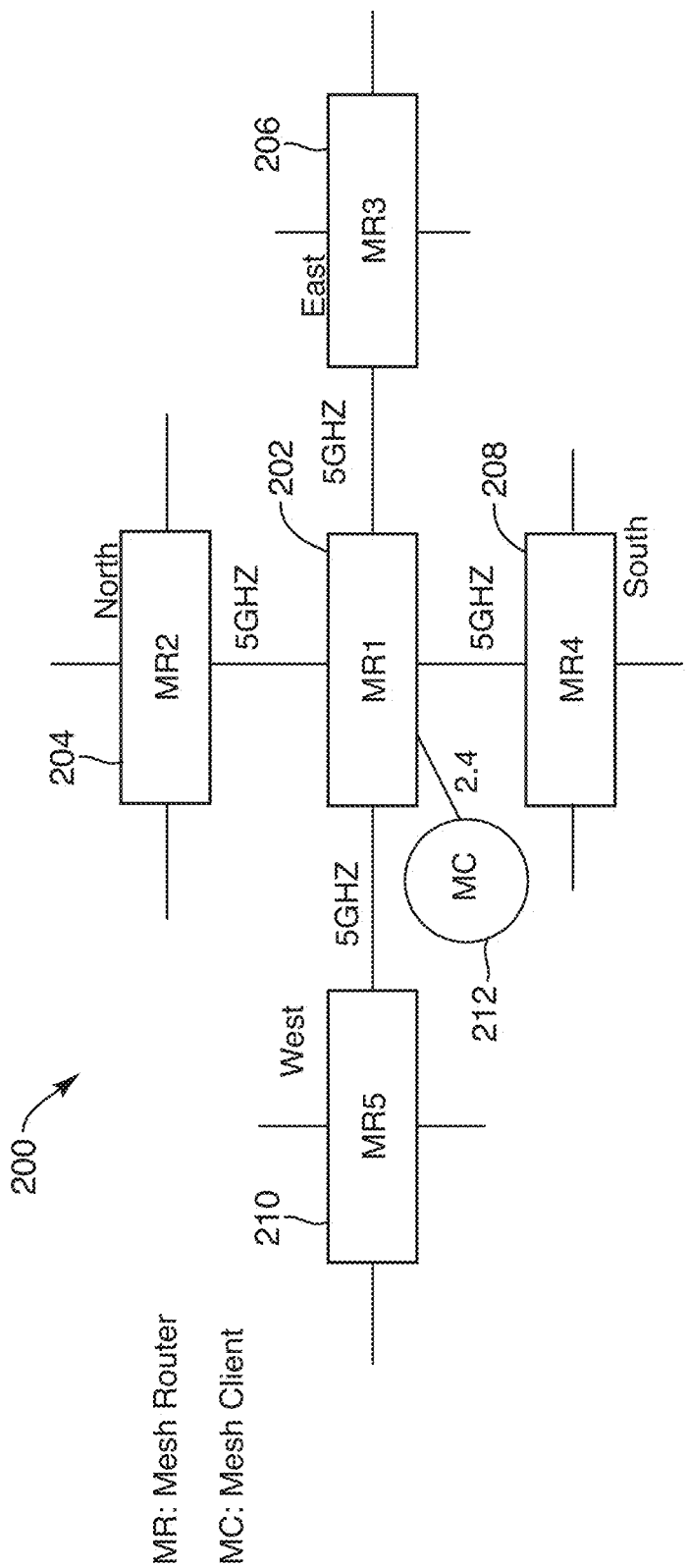
FIG. 2 is a block diagram of a network hardware device with five radios operating concurrently in a WMN according to one embodiment.

FIG. 2 is a block diagram of a network hardware device 202 with five radios operating concurrently in a wireless mesh network 200 according to one embodiment. The wireless mesh network 200 includes multiple network hardware devices 202-210. The network hardware device 202 may be considered a mesh router that includes four 5 GHz radios for the network backbone for multiple connections with other mesh routers, i.e., network hardware devices 204-210. For example, the network hardware device 204 may be located to the north of the network hardware device 202 and connected over a first 5 GHz connection. The network hardware device 206 may be located to the east of the network hardware device 202 and connected over a second 5 GHz connection. The network hardware device 208 may be located to the south of the network hardware device 202 and connected over a third 5 GHz connection. The network hardware device 210 may be located to the west of the network hardware device 202 and connected over a fourth 5 GHz connection. In other embodiments, additional network hardware devices can be connected to other 5 GHz connections of the network hardware device 202. It should also be noted that the network hardware devices 204-210 may also connect to other network hardware devices using its respective radios. It should also be noted that the locations of the network hardware devices 20-210 can be in other locations that north, south, east, and west. For example, the network hardware devices can be located above or below the mesh network device 202, such as on another floor of a building or house.

The network hardware device 202 also includes at least one 2.4 GHz connection to serve client consumption devices, such as the client consumption device 212 connected to the network hardware device 202. The network hardware device 202 may operate as a mesh router that has five radios operating concurrently or simultaneously to transfer mesh network traffic, as well as service connected client consumption devices. This may require that the 5GLL and 5GLH to be operating simultaneously and the 5GHL and 5GHH to be operating simultaneously, as described in more detail below. It should be noted that although the depicted embodiment illustrates and describes five mesh nodes, in other embodiments, more than five mesh nodes may be used in the WMN. It should be noted that FIG. 2 is a simplification of neighboring mesh network devices for a given mesh network device. The deployment of forty or more mesh network device may actually be located at various directions than simply north, south, east, and west as illustrated in FIG. 2. Also, it should be noted that here are a limited number of communication channels available to communicate with neighboring mesh nodes in the particular wireless technology, such as the Wi-Fi® 5 GHz band. The embodiments of the mesh network devices, such as the directional antennas, can help with isolation between neighboring antennas that cannot be separated physically given the limited size the mesh network device.

Figure 3:
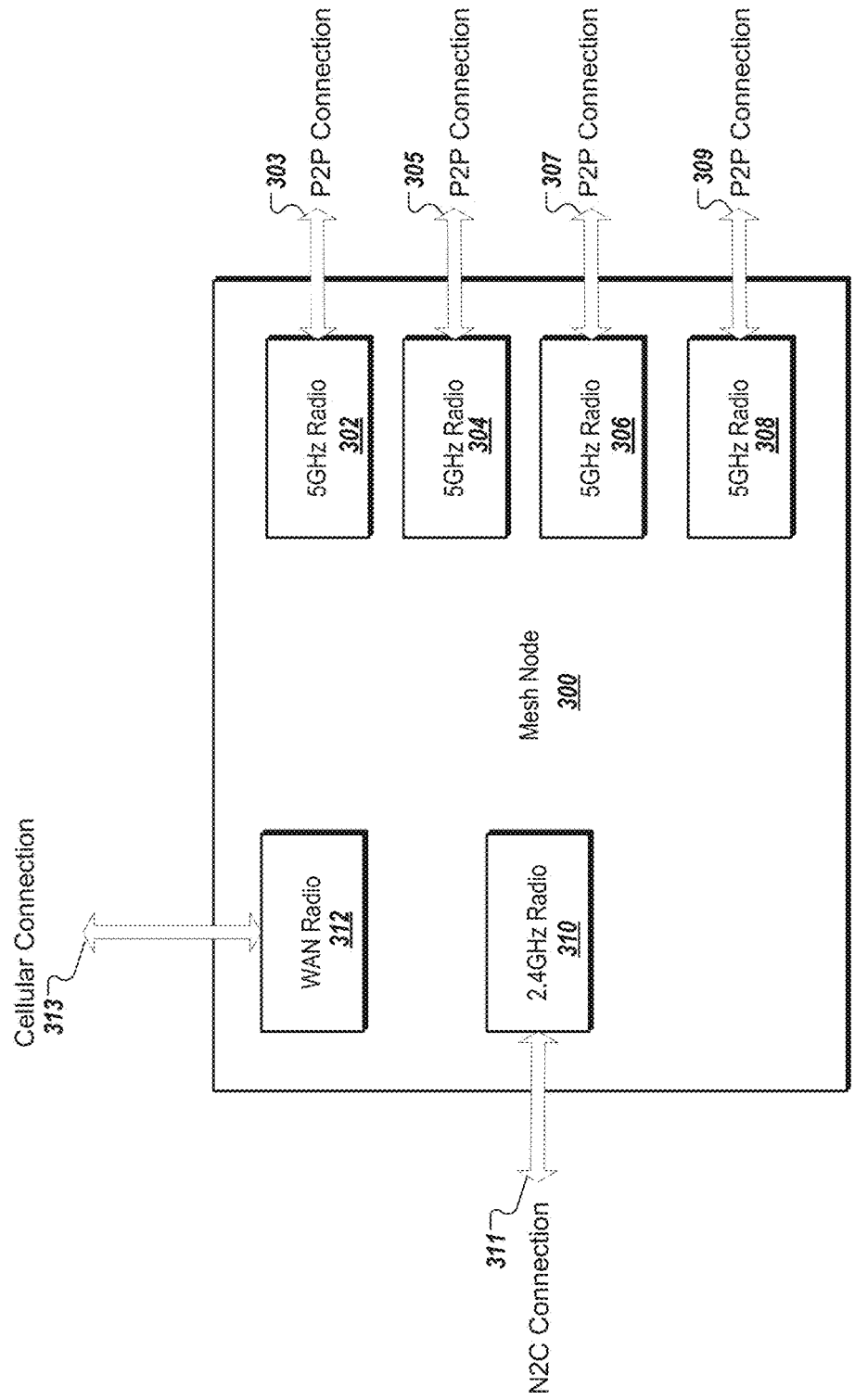
FIG. 3 is a block diagram of a mesh node with multiple radios according to one embodiment.
Figure 4:
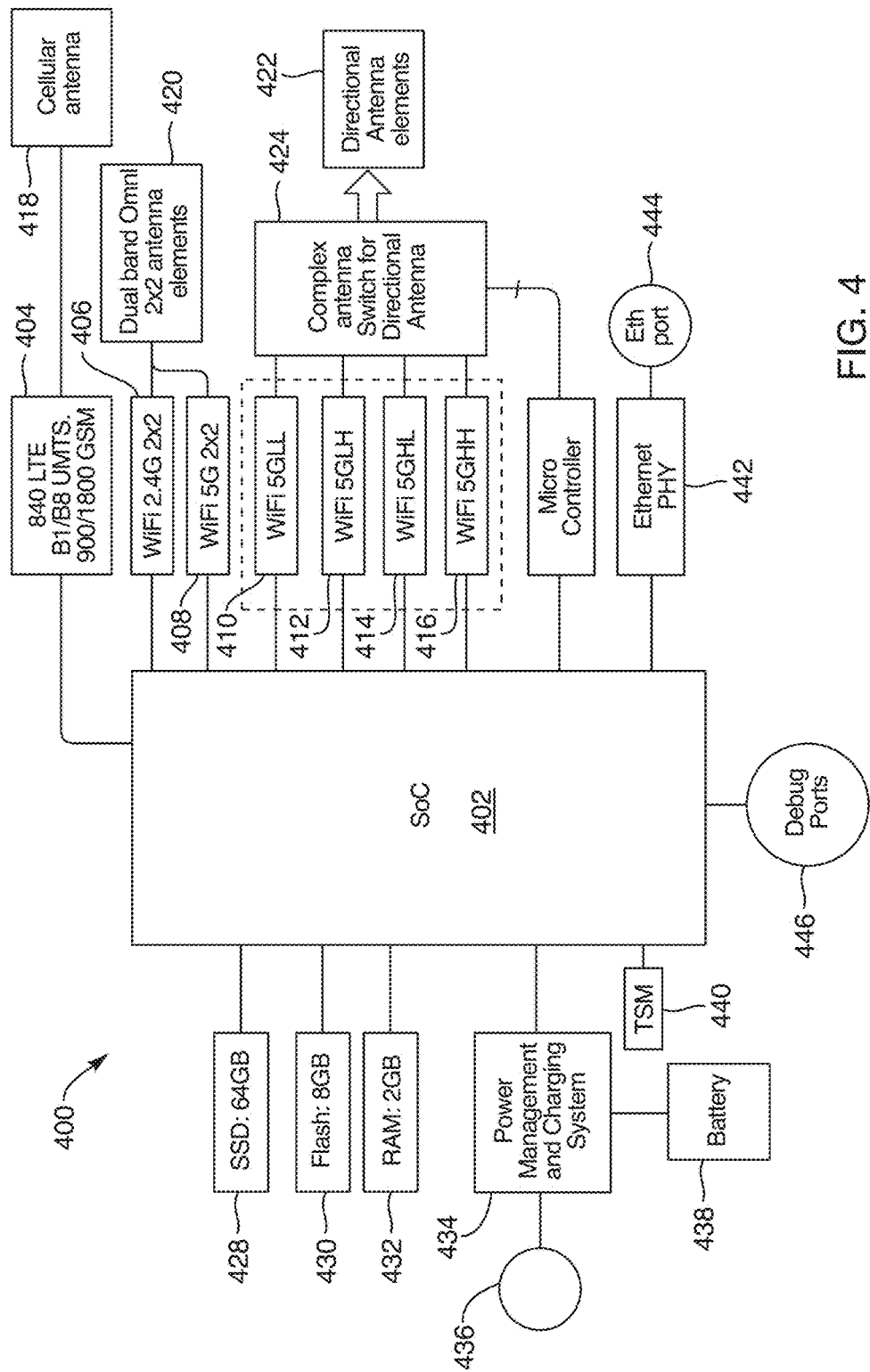
FIG. 4 is a block diagram of a mesh network device according to one embodiment.

FIG. 3 is a block diagram of a mesh node 300 with multiple radios according to one embodiment. The mesh node 300 includes a first 5 GHz radio 302, a second 5 GHz radio 304, a third 5 GHz radio 306, a fourth 5 GHz radio 308, a 2.4 GHz radio 310, and a cellular radio 312. The first 5 GHz radio 302 creates a first P2P wireless connection 303 between the mesh node 300 and another mesh node (not illustrated) in a WMN. The second 5 GHz radio 304 creates a second P2P wireless connection 305 between the mesh node 300 and another mesh node (not illustrated) in the WMN. The third 5 GHz radio 306 creates a third P2P wireless connection 307 between the mesh node 300 and another mesh node (not illustrated) in the WMN. The fourth 5 GHz radio 308 creates a fourth P2P wireless connection 309 between the mesh node 300 and another mesh node (not illustrated) in the WMN. The 2.4 GHz radio 310 creates a N2C wireless connection 311 between the mesh node 300 and a client consumption device (not illustrated) in the WMN. The cellular radio 312 creates a cellular connection between the mesh node 300 and a device in a cellular network (not illustrated). In other embodiments, more than one 2.4 GHz radios may be used for more N2C wireless connections. Alternatively, different number of 5 GHz radios may be used for more or less P2P wireless connections with other mesh nodes. In other embodiments, multiple cellular radios may be used to create multiple cellular connections.

In another embodiment, a system of devices can be organized in a WMN. The system may include a single ingress node for ingress of content files into the wireless mesh network. In one embodiment, the single ingress node is a mini-POP node that has attached storage device(s). The single ingress node may optionally include a point-to-point wireless connection, such as a microwave communication channel to a node of the CDN. The single ingress node may include a point-to-point wireless link to the Internet (e.g., a server device of the CDN) to access content files over the Internet. Alternatively to, or in addition to the point-to-point wireless link, the single ingress node may include a wired connection to a storage device to access the content files stored on the storage device. Multiple network hardware devices are wirelessly connected through a network backbone formed by multiple P2P wireless connections. These P2P wireless connections are wireless connections between different pairs of the network hardware devices. The P2P wireless connections may be a first set of WLAN connections that operate at a first frequency of approximately 5.0 GHz. The multiple network hardware devices may be wirelessly connected to one or more client consumption devices by one or more N2C wireless connections. Also, the multiple network hardware devices may be wirelessly connected to a mesh network control services (MNCS) device by cellular connections. Each network hardware device includes a cellular connection to a MNCS service hosted by a cloud computing system. The cellular connections may have lower bandwidths than the point-to-point wireless link.

The system includes a first network hardware device wirelessly connected to a first client consumption device by a first node-to-client (N2C) wireless connection and a second network hardware device wirelessly connected to the single ingress node. The first network hardware device can wirelessly connect to a first client consumption device over a first N2C connection. The N2C wireless connection may be one of a second set of one or more WLAN connections that operate at a second frequency of approximately 2.4 GHz. During operation, the first network hardware device may receive a first request for a first content file from the first client consumption device over the first N2C connection. The first network device sends a second request for the first content file to the second network hardware device through the network backbone via a first set of zero or more intervening network hardware devices between the first network hardware device and the second network hardware device. The first network device receives the first content file from the first network hardware device through the network backbone via the first set of zero or more intervening network hardware devices and sends the first content file to the first client consumption device over the first N2C connection. In a further embodiment, the first network hardware device includes another radio to wirelessly connect to a MNCS device by a cellular connection to exchange control data.

In a further embodiment, the first network hardware device is further to receive a third request for a second content file from a second client consumption device connected to the first network hardware device over a second N2C connection between the first network hardware device and the second client consumption device. The first network hardware device sends a fourth request for the second content file stored at a third network hardware device through the network backbone via a second set of zero or more intervening network hardware devices between the first network hardware device and the third network hardware device. The first network hardware device receives the second content file from the third network hardware device through the network backbone via the second set of zero or more intervening network hardware devices. The first network hardware device sends the second content file to the second client consumption device over the second N2C connection.

In one embodiment, the zero or more intervening network hardware devices of the first set are not the same as the zero or more intervening network hardware devices of the second set. In some embodiments, a path between the first network hardware device and the second network hardware device could include zero or more hops of intervening network hardware devices. In some cases, the path may include up to 12-15 hops within a mesh network of 100×100 network hardware devices deployed in the WMN. In some embodiments, a number of network hardware devices in the WMN is greater than fifty. The WMN may include hundreds, thousands, and even tens of thousands of network hardware devices.

In a further embodiment, the first network hardware device receive the fourth request for the second content file from a fourth network hardware device through the network backbone via a third set of zero or more intervening network hardware devices between the first network hardware device and the fourth network hardware device. The first network hardware device sends the second content file to the fourth network hardware device through the network backbone via the third set of zero or more intervening network hardware devices.

In some embodiments, the first network hardware device determines whether the first content file is stored in memory of the first network hardware device. The memory of the first network hardware device may be volatile memory, non-volatile memory, or a combination of both. When the first content file is not stored in the memory or the storage of the first network hardware device, the first network hardware device generates and sends the second request to a first network hardware device of the first set. Intervening network hardware devices can make similar determinations to locate the first content file in the WMN. In the event that the first content file is not stored in the second network hardware device or any intervening nodes, the second network hardware device can request the first content file from the mini-POP node, as described herein. When the mini-POP node does not store the first content file, the mini-POP can take action to obtain the first content file, such as requesting the first content file from a CDN over a point-to-point link. Alternatively, the human in the loop process can be initiated as described herein.

In a further embodiment, the second network hardware device receives the second request for the first content file and retrieves the first content file from the single ingress node when the first content file is not previously stored at the second network hardware device. The second network hardware device sends a response to the second request with the first content file retrieved from the single ingress node. The second network hardware device may store a copy of the first content file in memory or persistent storage of the second network hardware device for a time period.

In another embodiment, the single ingress node receives a request for a content file from one of the multiple network hardware devices over a P2P wireless connection. The request originates from a requesting consumption device. It should be noted that a video client can be installed on the client consumption device, on the network hardware device, or both. The single ingress node determines whether the content file is stored in a storage device coupled to the single ingress node. The single ingress node generates and sends a first notification to the requesting one of the network hardware devices over the P2P wireless connection when the content file is not stored in the storage device. The first notification includes information to indicate an estimated delay for the content file to be available for delivery. The single ingress node generates and sends a second notification to an operator of the first network hardware device. The second notification includes information to indicate that the content file has been requested by the requesting client consumption device. In this embodiment, the notifications can be pushed to the appropriate recipients. In another embodiment, an operator can request which content files had been requested in the WMN and not serviced. This can initiate the ingress of the content file into the WMN, even if with a longer delay.

In some embodiments, the mini-POP node is coupled to a storage device to store the content files as original content files for the wireless mesh network. A point-to-point wireless link may be established between the mini-POP node and a node of a CDN. In another embodiment, the mini-POP node is coupled to a node of a content delivery network (CDN) via a microwave communication channel.

In a further embodiment, the second network hardware device can wirelessly connect to a third network hardware device over a second P2P connection. During operation, the third network hardware device may receive a third request for a second content file from a second client consumption device over a second N2C connection between the third network hardware device and the second client consumption device. The third network hardware device sends a fourth request for the second content file to the second network hardware device over the second P2P connection. The third network hardware device receives the second content file from the second network hardware device over the second P2P connection and sends the second content file to the second client consumption device over the second N2C connection.

In another embodiment, the first network hardware device receives the fourth request for the second content file from the third network hardware device. The second network hardware device determines whether the second content file is stored in memory of the second network hardware device. The second network hardware device sends a fifth request to the first network hardware device over the first P2P connection and receive the second content file over the first P2P connection from the first network hardware device when the second content file is not stored in the memory of the second network hardware device. The second network hardware device sends the second content file to the third network hardware device over the second P2P connection.

In another embodiment, the second network hardware device may wirelessly connect to a third network hardware device over a second P2P connection. During operation, the third network hardware device may receive a third request for the first content file from a second client consumption device over a second N2C connection between the third network hardware device and the second client consumption device. The third network hardware device sends a fourth request for the first content file to the second network hardware device over the second P2P connection. The third network hardware device receives the first content file from the first network hardware device over the second P2P connection and sends the first content file to the second client consumption device over the second N2C connection.

In another embodiment, the first network hardware device receives a request for a content file from one of the network hardware devices over one of the P2P wireless connections. The request is from a requesting client consumption device connected to one of the multiple network hardware devices.

The first network hardware device determines whether the content file is stored in the storage device. The first network hardware device generates and sends a first notification to the one of the network hardware devices over the one of the P2P wireless connections when the content file is not stored in the storage device. The first notification may include information to indicate an estimated delay for the content file to be available for delivery. The first network hardware device generates and sends a second notification to an operator of the first network hardware device. The second notification may include information to indicate that the content file has been requested by the requesting client consumption device.

In a further embodiment, the P2P wireless connections are WLAN connections that operate in a first frequency range and the N2C connections are WLAN connections that operate in a second frequency range. In another embodiment, the P2P wireless connections operate at a first frequency of approximately 5.0 GHz and the N2C connections operate at a second frequency of approximately 2.4 GHz.

In some embodiments, at least one of the network hardware devices is a mini-POP) node and a point-to-point wireless link is established between the mini-POP node and a POP node of an ISP. In one embodiment, the point-to-point wireless link is a microwave link (e.g., directional microwave link) between the mini-POP node and the node of the CDN. In another embodiment, the mini-POP node stores an index of the content files store in attached storage devices.

In some embodiments, a mesh network architecture includes multiple mesh nodes organized in a self-contained mesh network. The self-contained mesh network may be self-contained in the sense that content resides in, travels through, and is consumed by nodes in the mesh network without requiring the content to be fetched outside of the mesh network. Each of the mesh nodes includes a first radio for inter-node communications with the other nodes on multiple P2P channels, a second radio for communications with client consumption devices on N2C channels. The mesh network architecture also includes a mini-POP node including a radio for inter-connection communications with at least one of the mesh nodes on a P2P channel. The mesh network architecture also includes a storage device coupled to the mini-POP, the storage device to store content files for distribution to a requesting client consumption device. The mini-POP node may be a single ingress point for content files for the self-contained mesh network. The storage devices of the mini-POP node may be internal drives, external drives, or both. During operation, a first node of the mesh nodes includes a first radio to wirelessly connect to a requesting client consumption device via a first N2C channel to receive a first request for a content file directly from the requesting client consumption device via a first N2C channel between the first node and the requesting client consumption device 1. A second radio of the first node sends a second request for the content file to a second node via a first set of zero or more intervening nodes between the first node and the second node to locate the content file within the self-contained mesh network. The second radio receives the content file from the second node in response to the request. The first radio sends the content file to the requesting client consumption device via the first N2C channel. The first node determines a location of the content file within the self-contained mesh network and sends a second request for the content file via a second P2P channel to at least one of the mini-POP or a second node, the second request to initiate delivery of the content file to the requesting client consumption device over a second path between the location of the content file and the requesting client consumption device.

In another embodiment, the first node stores a copy of the content file in a storage device at the first node. The first node receives a third request for the content file directly from a second client consumption device via a second N2C channel between the first node and the second client consumption device. The first node sends the copy of the content file to the second client consumption device via the second N2C channel in response to the third request.

In a further embodiment, the first node receives the content file via the second P2P channel in response to the second request and sends the content file to the requesting client consumption device via the first N2C channel or the first P2P channel in response to the first request. In some embodiments, the second path and the first path are the same.

In a further embodiment, the first node includes a third radio to communicate control data over a cellular connection between the first node and a mesh network control service (MNCS) device.

In one embodiment, the second radio can operate with 2×2 MIMO with maximum 40 MHz aggregation. This may result in per radio throughput of not more than 300 Mbps in 5 GHz and 150 Mbps in 2.4 GHz. Even with 5 radios (4×5 GHz and 1×2.4), the peak physical layer throughput will not need to be more than 1.4 Gbps. For example, a scaling factor of 1.4 may be used to arrive at a CPU frequency requirement. This implies the total processing clock speed in the CPU should not be less than 1.96 GHz (1.4×1.4=1.96 GHz). For example, the Indian ISM band has a requirement of 23 dBm EIRP. Since the WMN 100 needs to function under conditions where the mesh routers communicate with each other between homes, the propagation loss through multiple walls and over distances between homes, the link budget does not support sensitivity requirements for 802.11ac data rates. The per-node throughput may be limited to 300 Mbps per link—peak PHY rate. It should be noted that the scaling factor of 1.4 is just an example. In other cases, the scaling factor can be determined by a lot of factors, such as CPU architecture, number of cores, Wi-Fi® target offloading mode, NPU offload engine, software forwarding layers (L2 vs L3), or the like.

In another embodiment, a system includes a POP node having access to content files via at least one of data storage coupled to the POP node or a first point-to-point connection to a first device of an ISP. The system also includes multiple mesh nodes, organized in a WMN, and at least one of the mesh nodes is wirelessly coupled to the POP node. The WMN is a mesh topology in which the multiple mesh nodes cooperate in distribution of the content files to client consumption devices that do not have access to reliable access to the server device of the CDN or in an environment of limited connectivity to broadband infrastructure. A first node of the multiple mesh nodes is a multi-radio, multi-channel (MRMC) device that includes multiple P2P connections to form parts of a network backbone in which the first node wireless connects to other mesh nodes via a first set of WLAN channels reserved for inter-node communication. The first node also includes one or more N2C connections to wireless connect to one or more of the client consumption devices connected to the WMN via a second set of WLAN channels reserved for serving the content files to the client consumption devices. The first node may also include a cellular connection to wireless connect to a second device of the CDN. The second device may be part of a cloud computing system and may host a mesh network control service as described herein. It should be noted that the first point-to-point connection is higher bandwidth than the cellular connection.

FIG. 4A is a block diagram of a mesh network device 400 according to one embodiment. The mesh network device 400 may be one of many mesh network devices organized in a WMN (e.g., WMN 100). The mesh network device 400 is one of the nodes in a mesh topology in which the mesh network device 400 cooperates with other mesh network devices in distribution of content files to client consumption devices in an environment of limited connectivity to broadband Internet infrastructure, as described herein. The mesh network device 400 may be the mini-POP node 102 of FIG. 1. Alternatively, the mesh network device 400 may be any one of the mesh network devices 104-110 of FIG. 1. In another embodiment, the mesh network device 400 is any one of the network hardware devices 202-210 of FIG. 2. In another embodiment, the mesh network device 400 is the mesh node 300 of FIG. 3.

The mesh network device 400 includes a system on chip (SoC) 402 to process data signals in connection with communicating with other mesh network devices and client consumption devices in the WMN. The SoC 402 includes a processing element (e.g., a processor core, a central processing unit, or multiple cores) that processes the data signals and controls the radios to communicate with other devices in the WMN. In one embodiment, the SoC 402 is a dual core SoC, such as the ARM A15 1.5 GHz with hardware network acceleration. The SoC 402 may include memory and storage, such as 2 GB DDR RAM and 64 GB eMMC coupled to the SoC 402 via external HDD interfaces (e.g., SATA, USB3, or the like). The SoC 402 may include multiple RF interfaces, such as a first interface to the first RF module 404 (e.g., HSCI interface for cellular module (3G)), a second interface to the WLAN 2.4 GHz radio 406, a third interface to the WLAN 2.4 GHz radio 408, and multiple interfaces to the WLAN 5 GHz radios, such as on a PCIe bus. In one embodiment, the SoC 402 is the IPQ8064 Qualcomm SoC or the IPQ4029 Qualcomm SoC. Alternatively, other types of SoCs may be used, such as the Annapurna SoC, or the like. Alternatively, the mesh network device 400 may include an application processor that is not necessarily considered to be a SoC.

The mesh network device 400 may also include memory and storage. For example, the mesh network device 400 may include SSD 64 GB 428, 8 GB Flash 430, and 2 GB 432. The memory and storage may be coupled to the SoC 402 via one or more interfaces, such as USB 3.0, SATA, or SD interfaces. The mesh network device 400 may also include a single Ethernet port 444 that is an ingress port for Internet Protocol (IP) connection. The Ethernet port 444 is connected to the Ethernet PHY 442, which is connected to the SoC 402. The Ethernet port 444 can be used to service the mesh network device 400. Although the Ethernet port 444 could provide wired connections to client devices, the primary purpose of the Ethernet port 444 is not to connect to client devices, since the 2.4 GHz connections are used to connect to clients in the WMN. The mesh network device 400 may also include one or more debug ports 446, which are coupled to the SoC 402. The memory and storage may be used to cache content, as well as store software, firmware or other data for the mesh network device 400.

The mesh network device 400 may also include a power management and charging system 434. The power management and charging system 434 can be connected to a power supply 436 (e.g., 240V outlet, 120V outlet, or the like). The power management and charging system 434 can also connect to a battery 438. The battery 438 can provide power in the event of power loss. The power management and charging system 434 can be configured to send a SoS message on power outage and backup system state. For example, the WLAN radios can be powered down, but the cellular radio can be powered by the battery 438 to send the SoS message. The battery 438 can provide limited operations by the mesh network device 400, such as for 10 minutes before the entire system is completely powered down. In some cases, power outage will likely affect a geographic area in which the mesh network device 400 is deployed (e.g., power outage that is a neighborhood wide phenomenon). The best option may be to power down the mesh network device 400 and let the cloud service (e.g., back end service) know of the outage in the WMN. The power management and charging system 434 may provide a 15V power supply up to 21 watts to the SoC 402. Alternatively, the mesh network device 400 may include more or less components to operate the multiple antennas as described herein.

The mesh network device 400 includes a first radio frequency (RF) module 404 coupled between the SoC 402 and a cellular antenna 418. The first RF module 404 supports cellular connectivity using the cellular antenna 418. In one embodiment, the cellular antenna 418 includes a primary wide area network (WAN) antenna element and a secondary WAN antenna element. The first RF module 404 may include a modem to cause the primary WAN antenna, the secondary WAN antenna, or both to radiate electromagnetic energy in the 900 MHz band and 1800 MHz band for the 2G specification, radiate electromagnetic energy in the B1 band and the B8 band for the 3G specification, and radiate electromagnetic energy for the B40 band. The modem may support Cat3 band, 40 TD-LTE, UMTS: Band 1, Band 8, and GSM: 900/1800. The modem may or may not support CDMA. The cellular modem may be used for diagnostics, network management, down time media caching, meta data download, or the like. Alternatively, the first RF module 404 may support other bands, as well as other cellular technologies. The mesh network device 400 may include a GPS antenna and corresponding GPS module to track the location of the mesh network device 400, such as moves between homes. However, the mesh network device 400 is intended to be located inside a structure, the GPS antenna and module may not be used in some embodiments.

The mesh network device 400 includes a first set of wireless local area network (WLAN) modules 406, 408 coupled between the SoC 402 and dual-band omnidirectional antennas 420. A first WLAN module 406 may support WLAN connectivity in a first frequency range using one of the dual-band omnidirectional antennas 420. A second WLAN module 408 may support WLAN connectivity in a second frequency range using one of the dual-band omnidirectional antennas 420. The dual-band omnidirectional antennas 420 may be two omnidirectional antennas for 2.4 GHz. The directional antennas 422 may be eight sector directional antennas for 5 GHz with two antennas at orthogonal polarizations (horizontal/vertical) in each sector. These can be setup with 45 degree 3 dB beam width with 11 dB antenna gain. The dual-band omnidirectional antennas 420 and the directional antennas 422 can be implemented as a fully switchable antenna architecture controlled by micro controller 426. For example, each 5 GHz radio can choose any 2 sectors (for 2 2×2 MU-MIMO streams).

The mesh network device 400 includes a second set of WLAN modules 410-416 coupled between the SoC 402 and antenna switching circuitry 424. The second set of WLAN modules 410-416 support WLAN connectivity in the second frequency range using a set of directional antennas 422. The second set of WLAN modules 410-416 is operable to communicate with the other mesh network devices of the WMN. The antenna switching circuitry 424 is coupled to a micro controller 426. The micro controller 426 controls the antenna switching circuitry 424 to select different combinations of antennas for wireless communications between the mesh network device 400 and the other mesh network devices, the client consumption devices, or both. For example, the micro controller 426 can select different combinations of the set of directional antennas 422. The antenna switching circuitry 424 is described in more detail below with respect to FIGS. 5-7.

In another embodiment, a filter switch bank is coupled between the antenna switching circuitry 424 and the second set of WLAN modules 410-416. In another embodiment, the filter switch bank can be implemented within the antenna switching circuitry 424.

In the depicted embodiment, the first set of WLAN modules include a first a first 2×2 2.4 GHz MIMO radio 406 and a 2×2 5 GHz MIMO radio 408. The second set of WLAN modules includes a first 2×2 5 GHz MIMO radio 410 ("5GLL"), a second 2×2 5 GHz MIMO radio 412 ("5GLH"), a third 2×2 5 GHz MIMO radio 414 ("5GHL"), and a fourth 2×2 5 GHz MIMO radio 416 ("5GHH"). The dual-band omnidirectional antennas 420 may include a first omnidirectional antenna and a second omnidirectional antenna (not individually illustrated in FIG. 4). The set of directional antennas 422 comprises: a first horizontal orientation antenna; a first vertical orientation antenna; a second horizontal orientation antenna; a second vertical orientation antenna; a third horizontal orientation antenna; a third vertical orientation antenna; a fourth horizontal orientation antenna; a fourth vertical orientation antenna; a fifth horizontal orientation antenna; a fifth vertical orientation antenna; a sixth horizontal orientation antenna; a sixth vertical orientation antenna; a seventh horizontal orientation antenna; a seventh vertical orientation antenna; an eighth horizontal orientation antenna; an eighth vertical orientation antenna; a ninth antenna (upper antenna described herein); a tenth antenna (upper antenna); an eleventh antenna (bottom antenna); and a twelfth antenna (bottom antenna).

In one embodiment, the mesh network device 400 can handle antenna switching in a static manner. The SoC 402 can perform sounding operations with the WLAN radios to determine a switch configuration. Switching is not done on a per packet basis or at a packet level. The static switch configuration can be evaluated a few times a day by the SoC 402. The SoC 402 can include the intelligence for switching decision based on neighbor sounding operations done by the SoC 402. The micro controller 426 can be used to program the antenna switching circuitry 424 (e.g., switch matrix) since the mesh network device 400 may be based on CSMA-CA, not TDMA. Deciding where the data will be coming into the mesh network device 400 is not known prior to receipt, so dynamic switching may not add much benefit. It should also be noted that network backbone issues, such as one of the mesh network devices becoming unavailable, may trigger another neighbor sounding process to determine a new switch configuration. Once the neighbor sounding process is completed, the mesh network device 400 can adapt a beam patter to be essentially fixed since the mesh network devices are not intended to move once situated.

Figure 5:
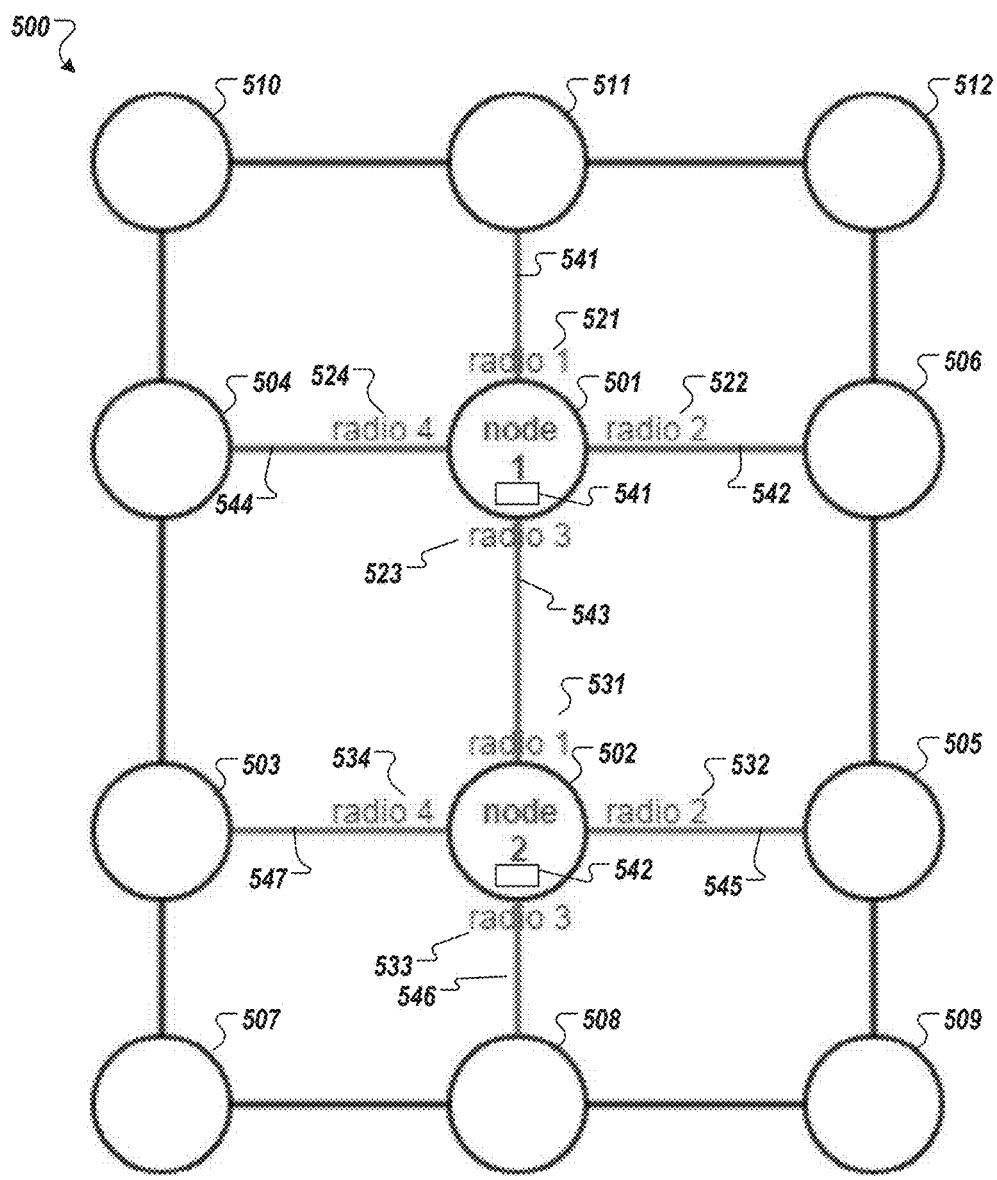
FIG. 5 is a diagram of a WMN with twelve network hardware devices, each having four radios to form a network backbone of peer-to-peer (P2P) wireless connections according to one embodiment.
Figure 6:
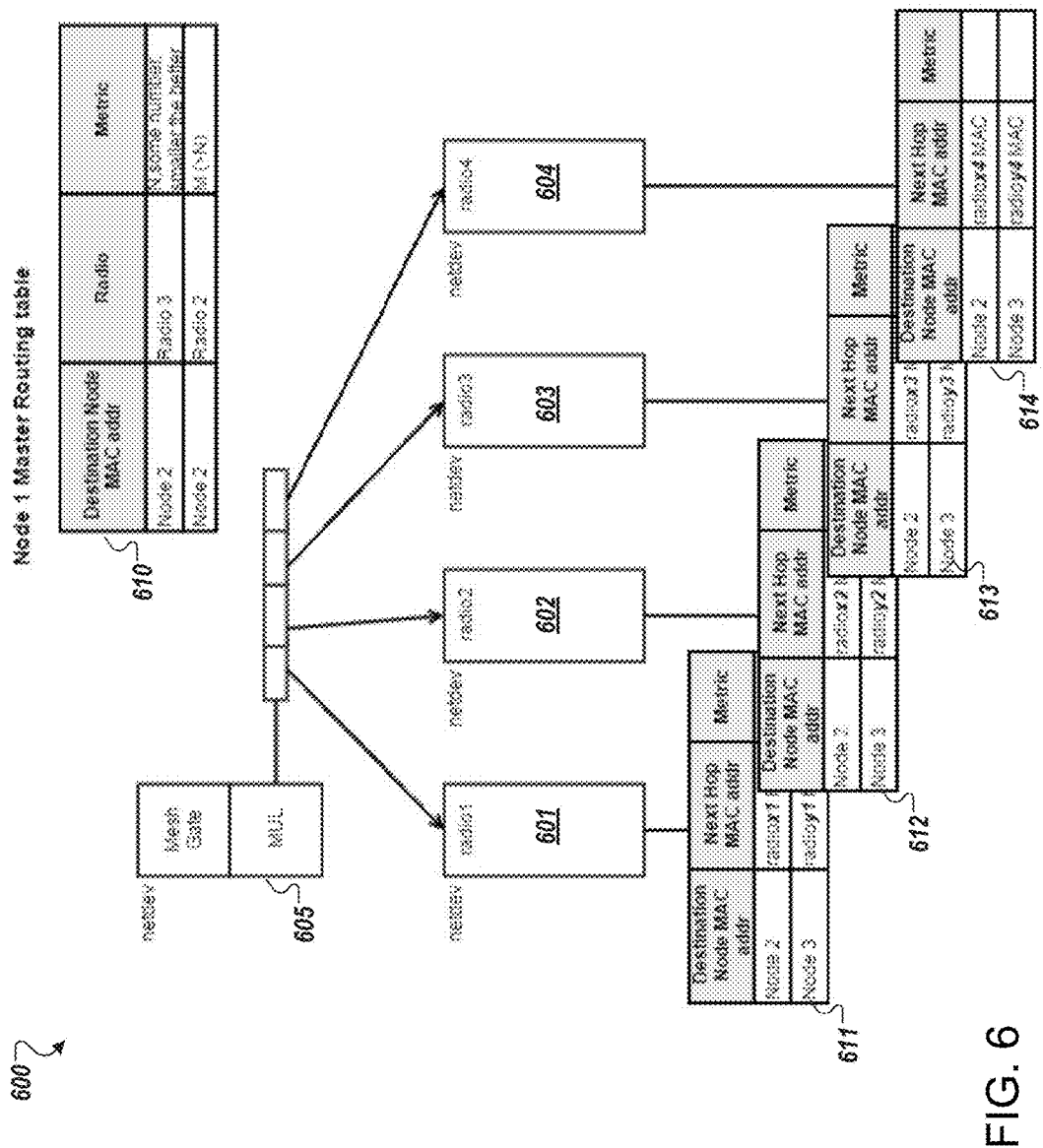
FIG. 6 is a diagram of a mesh network device with a MAC Unification Layer (MUL) architecture for routing mesh network traffic between mesh network devices of a WMN according to one embodiment.

In one embodiment, the antenna switching circuitry 424 includes multiple diplexers and switches to connect different combinations of antennas to the multiple radios. FIGS. 5-7 illustrate three different architectures for the antenna switching circuitry 424. The following diagrams use the following notations for reference:

ANT Hx→Horizontal orientation device side antenna
ANT Vx→Vertical orientation device side antenna
ANT VB→Vertical orientation device bottom side antenna
ANT HB→Horizontal orientation device bottom side antenna
ANT VU→Vertical orientation device top side antenna
ANT HU→Horizontal orientation device top side antenna
ANT0→Omni directional antenna
ANT1→Omni directional antenna One configuration for the antenna switching circuitry 424 is a switch matrix architecture. In this architecture, there are six 2×2 WLAN radios (also referred to as the Wi-Fi® radios). Five radios are 5 GHz band and one radio is a 2.4 GHz radio. A switch matrix is implemented to allow the connection of each and any of the four 2×2 radios to any of the Vx/Hx MIMO antennas. Based on the switch matrix configuration and based on the routing algorithms input, each 2×2 radio can connect to a specific antenna pair in a specific direction. Each 2×2 radio can operate using a dedicated and unique WLAN frequency channel concurrently or simultaneously. In this architecture, two of the radios (5 GHz radio and 2.4 GHz radio) may have fixed connections to the omnidirectional antennas (Ant0 and Ant1). These two radios may also have access to all the WLAN 2.4 GHz and 5 GHz band channels. In another embodiment, this architecture also may also have 4G/3G and 2G WAN radio to provide cellular connectivity to the mesh network device 400.

FIGS. 5-7B are generally directed to routing traffic on a network backbone of the WMN of mesh network devices. Each mesh network device has four radios with antennas in ten sectors. The four 5 GHz radios are used with directional antennas. For this example, only one neighbor is allowed per radio and each of four 5 GHz radios with directional antennas can connect to one antenna at a time. In one embodiment, each 5 GHz radio can connect to any 5 GHz channel. For radios with neighbor links, these radios will be on different channels. The only time when the radios (coupled to directional antennas) are on the same channel and transmitting is during neighbor discovery. Alternatively, in other embodiments, more neighbors may be allowed per radio. For example, each radio may have more than one neighbor if the neighbor is on the same channel and antenna sector.

FIG. 5 is a diagram of a WMN 500 with twelve network hardware devices 501-512, each having four radios to form a network backbone of peer-to-peer (P2P) wireless connections according to one embodiment. The WMN 500 includes multiple network hardware devices 501-512, referred to as nodes 501-512 for ease of description. In other embodiments, the WMN 500 may include more or less devices than twelve. The nodes 501-512 may be considered mesh routers that include four radios (e.g., four 5 GHz radios) for the network backbone for multiple connections with other mesh routers. For example, an eleventh node 511 may be located to the north of the first node 501 and connected over a first wireless connection 541 (e.g., 5 GHz connection). The sixth node 506 may be located to the east of the first node 501 and connected over a second wireless connection 542. The second node 502 may be located to the south of the first node 501 and connected over a third wireless connection 531. The fourth node 504 may be located to the west of the first node 501 and connected over a fourth wireless connection 544. In other embodiments, additional network hardware devices can be connected to other wireless connections of the first node 501. Similarly, the second node 502 can be connected to a third node 503 over a wireless connection 547, a fifth node 505 over a wireless connection 545, and an eighth node 508 over a wireless connection 546. It should also be noted that the nodes 503-512 may also connect to other nodes using its respective radios. It should also be noted that the locations of the nodes 501-512 can be in other locations that north, south, east, and west. For example, the nodes can be located above or below the first node 501, such as on another floor of a building or house.

The first node 501 includes a first radio 521, a second radio 522, a third radio 523, and a fourth radio 524. The first node 501 may also include at least one radio to establish a wireless connection (e.g., 2.4 GHz) with one or more client consumption devices. The first node 501 may operate as a mesh router that has four radios operating concurrently or simultaneously to transfer mesh network traffic, as well as a radio to service connected client consumption devices. This may require that the 5GLL and 5GLH to be operating simultaneously and the 5GHL and 5GHH to be operating simultaneously, as described in more detail below. The second node 502 includes a first radio 531, a second radio 532, a third radio 533, and a fourth radio 534. The second node 502 may also include at least one radio to establish a wireless connection (e.g., 2.4 GHz) with one or more client consumption devices. The second node 502 may operate as a mesh router that has four radios operating concurrently or simultaneously to transfer mesh network traffic, as well as a radio to service connected client consumption devices.

For routing data traffic between nodes 501-512, a MUL architecture is used for routing decisions where each node implements a MUL. The MULs 541, 542 have been illustrated in the first node 501 and the second node 502, respectively. The other nodes implement a MUL, although not illustrated and labeled. The MUL is a software interface layer that interacts with the underlying physical (PHY) layer of the radios. For each node, there are four radios to serve the mesh backbone. Each physical radio is assigned its own media access control (MAC). A MAC address, also called physical address, is a unique identifier assigned to network interfaces for communications on the physical network segment. MAC addresses are used as a network address for most IEEE 802 network technologies. A node MAC address is assigned to each node and each node represents a virtual interface that can be assigned the node MAC address. Routing decisions can be made with this node MAC address. The node's multiple radios can also be assigned MAC address according to an MAC address assignment scheme. In one embodiment, a first portion of the MAC address (e.g., the most significant 45 bits of a 48-bit MAC address) can be fixed and an assignment of a second portion of the MAC address can be assigned to the virtual interface for the node and the individual radios. In this embodiment, there are 7 MAC addresses. The following table illustrates an exemplary address assignment scheme for this embodiment.

| Last 3 Bits of MAC address | MAC Address assignment |
|---|---|
| 0 | Node (Virtual Interface) |
| 1 | Radio 1 (directional) |
| 2 | Radio 2 (directional) |
| 3 | Radio 3 (directional) |
| 4 | Radio 4 (directional) |

-continued

| Last 3 Bits of MAC address | MAC Address assignment |
|---|---|
| 5 | Omni 2.4 GHz Radio |
| 6 | Omni 5 GHz Radio |
| 7 | Reserved |

In this embodiment, it is assumed that each mesh node has 4 radios and each radio may communicate with at most one neighbor node. As noted herein, a radio can communicate with more than one neighbor node if they use the same channel and sector. A neighbor node is a node to which a node has established a wireless connection, such as a P2P wireless connection, without any intervening nodes between the node and the neighbor node. In this embodiment, the first node 501 includes four neighbor nodes, including the eleventh node 511 over the wireless connection 541, the sixth node 506 over the wireless connection 542, the second node 502 over the wireless connection 543, and the fourth node 504 over the wireless connection 544. In one embodiment, the WMN 500 implements the IEEE 802.11s mesh implementation for defining how wireless devices can interconnect to create a WLAN mesh network. The 802.11 is a set of IEEE standards that govern wireless networking transmission methods. They are commonly used today in their 802.11a, 802.11b, 802.11g, and 802.11n versions to provide wireless connectivity in the home, office and some commercial establishments. The 802.11s is an IEEE 802.11 amendment for mesh networking.

In one embodiment, the MUL 541 sits on top of the four radios 521-524 and acts as a virtual interface for the first node 501. The MUL 541 owns the node MAC address. The MUL 541 keeps a list of the four radio network devices (abbreviated "radio netdevs"). The MUL 541 is also considered a netdev for an operating system's data stack for routing data traffic to and from the four radio netdevs. The MUL 541 creates and maintains a master routing table. In particular, the MUL 541 consolidates local routing tables from all four radios into the master routing table, such as illustrated in FIG. 6. The MUL 541 prioritizes routing based on a metric reported by the individual radios in the local routing tables. During operation, the MUL 541 decides to which radio of the first node 501 to forward the frames. At most, there are four different routes to a single destination node, as described herein.

In one embodiment, the MUL 541 operates in a control plane and in a data plane. Operations by the MUL in control plane may include peering, path discovery, and messaging (such as to pause or resume radios), as described herein. In the data plane, the MUL 541 decides to which radio to forward the frame based on the master routing table for transmitting data. All frames received by the individual radios go to the MUL for forwarding decisions as described in more detail below.

It should be noted that although the depicted embodiment illustrates and describes twelve mesh nodes, in other embodiments, more than twelve mesh nodes may be used in the WMN 500. It should be noted that FIG. 5 is a simplification of neighboring mesh network devices for a given mesh network device. The deployment of forty or more mesh network device may actually be located at various directions than simply north, south, east, and west as illustrated in FIG. 5. Also, it should be noted that here are a limited number of communication channels available to communicate with neighboring mesh nodes in the particular wireless technology, such as the Wi-Fi® 5 GHz band. The embodiments of the mesh network devices, such as the directional antennas, can help with isolation between neighboring antennas that cannot be separated physically given the limited size the mesh network device.

FIG. 6 is a diagram of a mesh network device 600 with a MAC Unification Layer (MUL) architecture for routing mesh network traffic between mesh network devices of a WMN according to one embodiment. The mesh network device 600 includes a first radio 601, a second radio 602, a third radio 603, and a fourth radio 604. The mesh network device 600 includes a MUL 605 for routing traffic between the mesh network device of the WMN using the four radios. The MUL 605 is assigned a node MAC address and is considered a netdev of a data stack of an operating system executing on a processor of the mesh network device 600. The MUL 604 decides which of the four radios 601-604 to forward frames to when transmitting data to another one of the mesh network device. The MUL 604 uses a master routing table 610 for routing decisions. The MUL 605 also receives frames received by the individual radios 601-604. The MUL 605 decides whether the frame is directed to the mesh network device 600 itself or directed to another mesh network device in the WMN. In the event that the frame is directed to another mesh network device, the MUL 605 decides which of the four radios 601-604 to forward the frame for transmission to a neighbor node. The neighbor node may be the destination node for the frame or may be an intervening node in a path to the destination node, as described herein.

Each of the four radios 601-604 store local routing tables 611-614, respectively. The local routing tables 611-614 each store a destination node MAC address, a next hop MAC address, and a metric. The destination MAC address identifies a destination node. The next hop MAC address identifies a radio MAC address that is used to route traffic to the destination node. The metric is a value that indicates a performance of the wireless connection by the corresponding radio. The destination node and corresponding next hop MAC address can be determined by the MUL 605 by performing path discovery operations, as described below with respect to FIG. 7A. The MUL 605 collects the destination node MAC address and metrics from the local routing tables 611-614, consolidates and prioritizes the destination node MAC address and the radio based on the metrics, and stores the destination node MAC addresses, corresponding radios, and corresponding metrics in the master routing table 610 for routing decisions. An example of routing frames between a client consumption device and a destination node is described below with respect to FIG. 7B.

The following description is directed to examples of routing data traffic on the network backbone of the WMN. In this example, a mesh network device has four radios with antennas in 10 sectors; eight horizontal sectors and two vertical sectors. For example, when a mesh network device boots up, the mesh network device needs to find its neighbor mesh network devices. The mesh network device scans omnidirectionally over 2.4 GHz for access point (AP) beacons that contain an information element (IE). The mesh network device determines where each of those neighbors is located and therefore which of its directional antennas must be used to reach each neighbor through a process called neighbor discovery. Once neighbors are found and located through the neighbor discovery process, neighbor mesh network devices are chosen via a neighbor selection process. The initial selection may be done locally. In one embodiment, an optimized selection using the MNCS as described herein that can take a full network perspective of the WMN to globally select neighbors for any one of the mesh network devices in the WMN. Once neighbors are selected by the neighbor selection process, the mesh network device can store the radio configuration for routing data traffic to neighboring mesh network devices. In one embodiment, after neighbor mesh network devices are selected, a MUL is informed of the new radio configuration, and the MUL can begin mesh peering and authentication, as well as path discovery.

For description of the neighbor discovery process, four 5 Gz radios are used with directional antennas as shown in FIG. 5A. For this example, only one neighbor is allowed per radio and each of four 5 GHz radios with directional antennas can connect to one antenna at a time. For each mesh network device, there are 4 radios to serve the mesh network backbone, where each physical radio will have its own MAC address. The Node MAC address represents a virtual interface. The routing decisions are made with this node MAC address. In one embodiment, the MAC addresses for all six radios are configured such that each individual radio's MAC address can be derived from a base Node MAC address assigned to the mesh network device. In one embodiment, the MAC addresses are 48 bits and the first 45 bits are common to all MAC addresses for the mesh network device, and the last 3 bits are reserved for individual radios. The following table provides an example of the assignments to radios using the last 3 bits.

| | |
|---|---|
| 000 | Node MAC |
| 001 | Directional radio 1 |
| 010 | Directional radio 2 |
| 011 | Directional radio 3 |
| 100 | Directional radio 4 |
| 101 | Omnidirectional 2.4 GHz radio |
| 110 | Omnidirectional 5 GHz radio |
| 111 | Reserved |

Figure 7A:
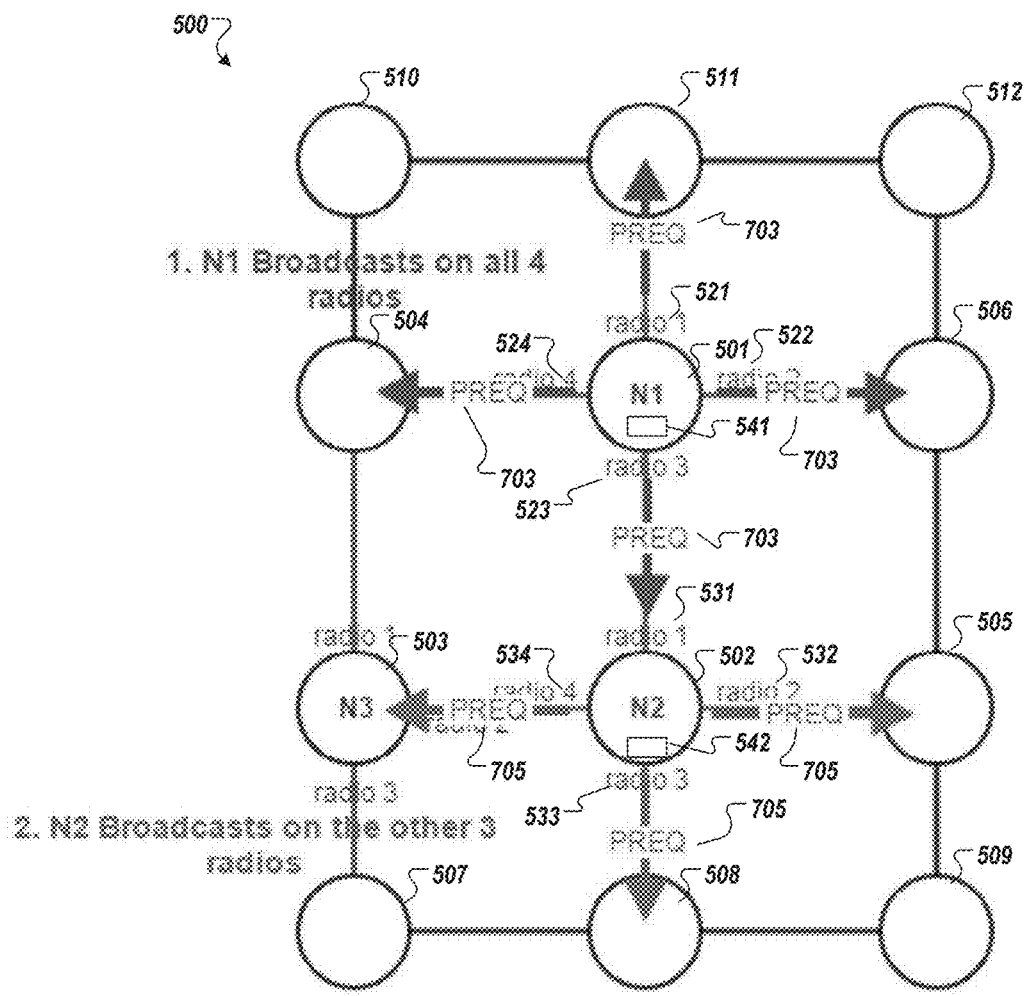
FIG. 7A is a diagram illustrating path discovery requests sent by the MUL of the mesh network devices in the WMN of FIG. 5 according to one embodiment.

For the following description, the MAC address assignment scheme in the table above are used for a path discovery process as illustrated in FIG. 7A.

FIG. 7A is a diagram illustrating path discovery requests sent by the MUL of the mesh network devices in a WMN 500 of FIG. 5 according to one embodiment. In this embodiment, the first mesh network device 501 is a source node. The source node broadcasts a path discovery request (PREQ) on all four radios 521-524. The mesh network devices 511, 506, 502, and 504 receive the PREQ. These nodes are not the destination nodes, so these mesh network devices broadcast the PREQ on all other radios. For example, since the second mesh network device 502 receives the PREQ 703 on the first radio 531, the second mesh network device 502 broadcasts the PREQ 705 on the second radio 532, the third radio 533, and the fourth radio 534. In one embodiment, the PREQ 703 is broadcast only once per hybrid wireless mesh protocol (HWMP) sequence number. A destination node sends a discovery path response (PREP) per radio. An intermediate node relays the first received PREP. At most there are four paths at the source node.

Figure 7B:
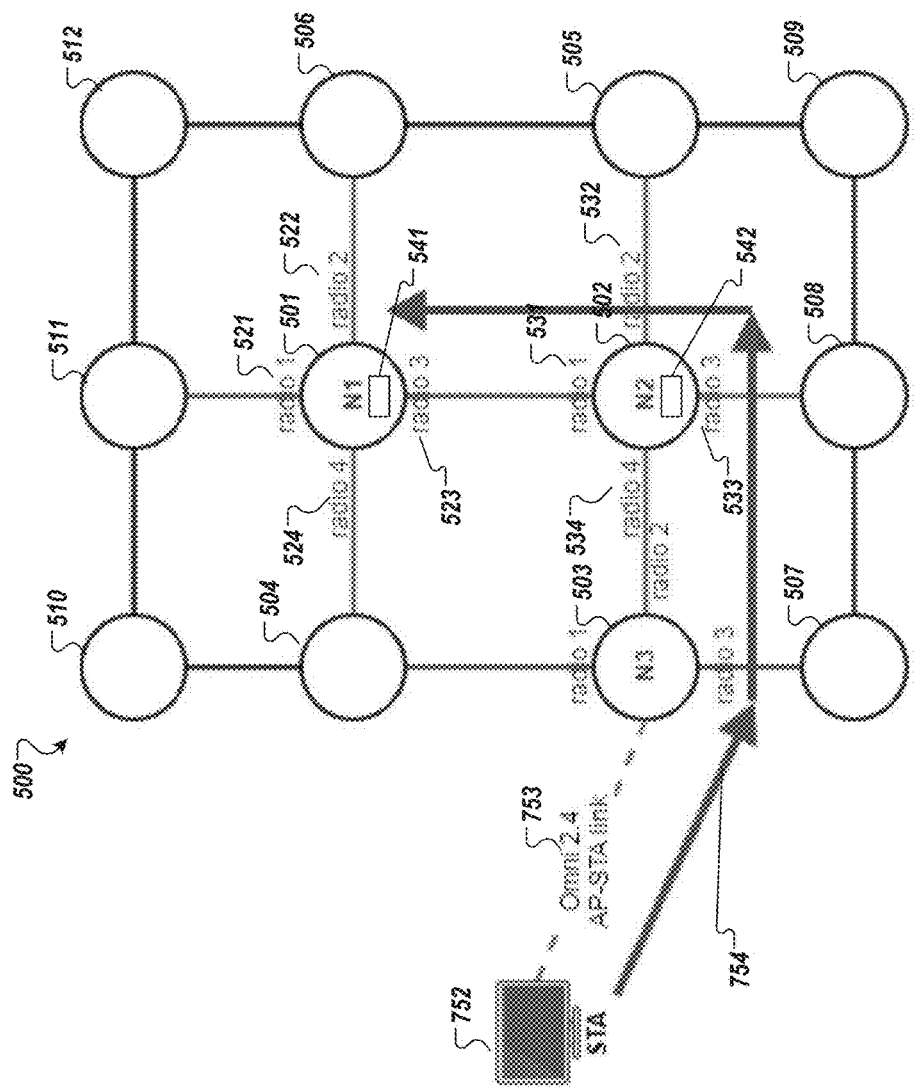
FIG. 7B is a diagram illustrating a routing example between a client consumption device and a first node of the WMN of FIG. 5 according to one embodiment.

Once the paths are discovered between the source node and the destination node, the data traffic can be routed on the network backbone, as such in a routing sample described and illustrated with respect to FIG. 7B.

FIG. 7B is a diagram illustrating a routing example between a client consumption device 752 and a first node (mesh network device 503) of the WMN of FIG. 5 according to one embodiment. A link 753 (STA-AP link) is established between the client consumption device 752 and the third mesh network device 503. An omnidirectional radio of the mesh network device 503 receives a request 754 for a content item from the client consumption device 752. The network backbone using the 5 GH radio and the omnidirectional radio can be bridged and use MAC layer routing. The third mesh network device 503 can operate as a source node that can determine how to find the destination node. Content distribution/caching can be used by the third mesh network device 503 to determine a path to a destination node. In this example, the destination node is the first mesh network device 501. In one embodiment, six MAC addresses can be used for routing: 1) a first pair includes a first address (Addr1) and a second address (Addr2) that are the receive and transmitter addresses; 2) a second pair includes a third address (Addr3) and a fourth address (Addr4) that are the mesh destination and source addresses; and 3) a third pair that includes a fifth address (Addr5) and a sixth address (Addr6) that are the end-to-end destination and source addresses.

To illustrate the MAC frame addressing, a source is the client consumption device 752 (STA) that is connected to the third mesh network device 503 (N3) over an AP-STA link and the destination node is the first mesh network device 501 (N1) with two hops in the WMN 500, from the third mesh network device 503 to second mesh network device 502 (N3 to N2) and from the second mesh network device 502 to the first mesh network device 501 (N2 to N1).

At the third mesh network device 503 (mesh hop 1 processed at N3), the third mesh network device 503 receives the request 753 from the client consumption device 752 and resolves the destination node to be the first mesh network device 501 (N1). The request 753 may be a hypertext transfer protocol (HTTP) request. Alternatively, the request may be an application layer protocol request.

The MUL of the third mesh network device 503 looks up a destination N1 in the master routing table and forwards the frame to radio 2 and the radio 2 looks up in the local routing table a next hop. The next hop is radio 4 of the second mesh network device 502 (N2). The radio 2 sends the following frame to N2-radio4:

| Addr1 | Addr2 | Addr3 | Addr4 | Addr5 | Addr6 |
|---|---|---|---|---|---|
| N2-Radio4 | N3-Radio2 | N1-NodeMAC | N3-NodeMAC | N1-NodeMAC | STA |

The frame is received at the radio 4 534 of the second mesh network device 502, and the radio 4 534 passes the frame to the MUL 542. The MUL 542 looks up the third address (Addr3—mesh destination address) in the master routing table and forwards the frame to first radio (radio1) 531. The first radio 531 looks up in the local routing table a next hop. The next hop is the third radio (radio3) 523 of the first mesh network device 501. The first radio 531 sends the following frame to the third radio 532 of the first mesh network device 501:

| Addr1 | Addr1 | Addr3 | Addr4 | Addr5 | Addr6 |
|---|---|---|---|---|---|
| N1-Radio3 | N2-Radio1 | N1-NodeMAC | N3-NodeMAC | N1-NodeMAC | STA |

At the first mesh network device 501, the third radio 532 receives the frame and passes it to the MUL 541. The MUL 541 matches its nodeMAC with the third address (addr3), indicting the destination has been reached and the MUL 541 forwards the frame to a data stack of an operating system executing on the first mesh network device 501.

In another embodiment, the MUL operates as a virtual interface between an operating system data stack and the four radios for routing data traffic to and from the four radios. The MUL is assigned a node MAC address for the mesh network device and each of the four radios is assigned a unique MAC address. The MUL can store a list including a node MAC address assigned to the respective mesh network device and a unique MAC address assigned to each of the four radios. As described herein, the MUL receives a local routing table from each of the four radios, each table including a first MAC address of a destination mesh network device, a second MAC address of a next-hop mesh network device, and a performance metric of a path between the mesh network device and the destination mesh network device through the next hop mesh network device. Alternatively, the performance metric can be for a link between the mesh network device and the next hop mesh network device. The MUL generates a master routing table, for example, by consolidating some or all of the entries of the four local routing tables into entries of the master routing table. An entry of the master routing table may include the destination node MAC addresses from one of the local routing tables, a corresponding one of the four unique MAC addresses of the four radios from which the local routing table originates, and a corresponding one of the performance metrics from the respective one of the four local routing tables. The MUL the master routing table can be prioritized according to the performance metric. When the MUL receives first frame data, the MUL can forward this first frame data to one of the four radios using the master routing table.

In one embodiment, a mesh network device includes a first radio, a second radio, a third radio, and a fourth radio, each of the radios being coupled to an application processor. The application processor includes a software interface layer for routing data traffic to and from each of the first, second, the third, and the fourth radios and an operating system data stack. The software interface layer is assigned a node MAC address. The first radio is associated with a first MAC address, the second radio is associated with a second MAC address, the third radio is associated with a third MAC address and the fourth radio is associated with a fourth MAC address. During operation, the software interface layer receives a first local routing table from the first radio, the first local routing table comprising a fifth MAC address of a second mesh network device and a performance metric of a path between the mesh network device and the second mesh network device using the first radio. The software interface layer receives a second local routing table from the second radio, the second local routing table comprising the fifth MAC address of the second mesh network device and a performance metric of a path between the mesh network device and the second mesh network device using the second radio. The software interface layer receives a third local routing table from the third radio, the third local routing table comprising the fifth MAC address of the second mesh network device and a performance metric of a path between the mesh network device and the second mesh network device using the third radio. The software interface layer receives a fourth local routing table from the fourth radio, the fourth local routing table comprising the fifth MAC address of the second mesh network device and a performance metric of a path between the mesh network device and the second mesh network device using the fourth radio. The software interface layer generates a master routing table. Entries in the master routing table can each include the destination MAC address, i.e., the fifth MAC address, a radio identifier from which the respective routing table originates, and the respective performance metric using that particular radio. For example, an entry of the master routing table includes the fifth MAC address, a radio identifier of the second radio, and the performance metric between the mesh network device and the second mesh network device using the second radio. When frame data is received, the software interface layer can look up the destination mesh node address in the master routing table to determine to forward the frame data to the second radio to be transmitted.

In a further embodiment, the mesh network device receives an HTTP request, including the first frame data, from a client consumption device via a fifth radio where the four radios are used for the network backbone. The IEEE 802.11 transmission address (TA) in the same HTTP request specifies a client MAC address for the client consumption device. Alternatively, the mesh network device can receive other application layer protocol requests than HTTP. The mesh network device determines, or otherwise resolves from the first MAC address, that a second mesh network device is the destination mesh network device. In this embodiment, the second mesh network device is not the mesh network device or the next-hop mesh network device. The second mesh network device is not directly connected to the mesh network device and there is at least one intervening mesh network device between the second mesh network device and the mesh network device. The MUL of the mesh network device determines a first radio (TX radio) from among the four radios to which to forward the first frame by looking up an entry, corresponding to the second mesh network device, in the master routing table. The first frame includes a transmitter address field with a transmitter MAC address for the transmit radio, a source node address field with the node MAC address, a destination node address field with a node MAC address of the second mesh network device, and a client address field with the client MAC address of the client consumption device. The MUL forwards the first frame data to the first radio. The first radio determines a radio (RX radio) of a next-hop mesh network device to send the first frame data by looking up an entry, corresponding to a next-hop mesh network device, in the local routing table at the first radio. The first radio populates a receiver address field in the first frame data with a receiver MAC address for the radio of the next-hop mesh network device and transmits the first frame data to the radio of the next-hop mesh network device.

In another embodiment, the application processor receives an application layer protocol request, comprising the first frame data, from a client consumption device via the fifth radio. The application layer protocol request includes a client MAC address for the client consumption device and the first frame data includes the fifth MAC address of the second mesh network device as a destination for the request. The application processor determines the second radio from among the four radios to transmit the first frame data to the second mesh network device by looking up the entry in the master routing table. The application processor forwards the first frame data to the second radio. The second radio determines a radio of a next-hop mesh network device to send the first frame data by looking up an entry in the second routing table stored at the second radio, the entry in the second routing table comprising a receiver MAC address of the radio of the next-hop mesh network device in the path to the second mesh network device. The second radio includes the receiver MAC address for the radio of the next-hop mesh network device in the first frame data and transmits the first frame data to the radio of the next-hop mesh network device.

In another embodiment, the application processor receives a second frame data from the first radio, the second frame data including the fifth MAC address of the second mesh network device as a destination for the request. The application processor forwards the second frame data to the software interface layer. The software interface layer determines the second radio to transmit the second frame data to the second mesh network device by looking up the entry in the master routing table. The second frame data comprises a transmitter MAC address for the second radio, a node MAC address for a source node mesh network device, a node MAC address for the second mesh network device, and the client MAC address of the client consumption device. The software interface layer forwards the second frame data to the second radio. The second radio determines a radio of a next-hop mesh network device to send the second frame data by looking up the entry in the second routing table stored at the second radio, the entry in the second routing table comprising a receiver MAC address of the radio of the next-hop mesh network device in the path to the second mesh network device. The second radio includes the receiver MAC address for the radio of the next-hop mesh network device in the second frame data and transmits the second frame data to the radio of the next-hop mesh network device.

In a further embodiment, the application processor receives third frame data from the first radio, the third frame data including the fifth MAC address of the second mesh network device as a destination for the request. The application processor forwards the third frame data to the software interface layer. The software interface layer matches the node MAC address of the mesh network device to the fifth MAC address in the third frame data in the master routing table and forwards the third frame data to a data stack of an operating system of the mesh network device.

In another embodiment, the mesh network device receives the first frame data from a first radio of the four radios and forwards the first frame data to the MUL. The MUL determines a transmit radio from among the four radios to which to forward a second frame data by looking up a node MAC address in a destination node address field of the first frame data in the master routing table. The second frame data includes a transmitter address field with a transmitter MAC address for the transmit radio, a source node address field with a node MAC address for a source node mesh network device, a destination node address field with a node MAC address for the second mesh network device, and a client address field with the client MAC address of the client consumption device. The MUL forwards the second frame data to the transmit radio. The transmit radio determines a receive radio of a next-hop mesh network device to send the second frame data by looking up a next-hop mesh network device in the local routing table at the first transmit radio. The transmit radio populates a receiver address field in the second frame data with a receiver MAC address for the receive radio of the next-hop mesh network device and transmits the second frame data to the receive radio of the next-hop mesh network device.

In a further embodiment, the mesh network device receives the first frame data from a first radio of the four radios and forwards the first frame data to the MUL. The MUL matches the node MAC address of the mesh network device to a node MAC address in a destination node address field of the first frame data in the master routing table. The MUL forwards the first frame data to a data stack of an operating system of the mesh network device.

In another embodiment, a processing device, which is coupled to a first radio, a second radio, and memory, receives a request for digital content from a client consumption device via the first radio. The processing device determines that a second mesh network device is a destination for the request. The processing device determines, using a first routing table stored in the memory, that the second radio is to transmit the request to the second mesh network device. The first routing table includes an entry with an address for the second mesh network device and an identifier of the second radio. The processing device forwards the request to the second radio. The second radio determines, using a second routing table stored at the second radio, that a first radio of a third mesh network device that is communicatively coupled to the second mesh network device. The third mesh network device is along a first communication path between the first and the second mesh network devices. The second routing table includes an entry with an address of the first radio of the third mesh network device and the address of the second mesh network device. The processing device sends the request to the first radio of the third mesh network device. In a further embodiment, the processing device is coupled to a third radio. The processing device receives a second request from a fourth mesh network device via the second radio. The processing device determines that a fifth mesh network device is a destination for the second request. The processing device determines, using the first routing table, that the third radio is to transmit the second request to the fifth mesh network device. The third radio determines, using a third routing table stored at the third radio, that the second request is to be communicated to a radio of a sixth mesh network device, the sixth mesh network device being the next device along a second communication path between the fourth mesh network device and the fifth mesh network device. The processing device sends the second request to the radio of the sixth mesh network device.

In a further embodiment, the processing device is coupled to a third radio and receives a second request from a fourth mesh network device via the second radio. The processing device determines that a fifth mesh network device is a destination for the second request. The processing device determines, using the first routing table, that the third radio is to transmit the second request. The third radio determines, using a third routing table stored at the third radio, that the second request is to be communicated to a radio of a sixth mesh network device, the sixth mesh network device being the next device along a second communication path between the fourth mesh network device and the fifth mesh network device. The processing device sends the request to the radio of the sixth mesh network device.

In a further embodiment, the processing device is coupled to a third radio and the processing device receives a second request from a fourth mesh network device via the second radio. The processing device determines that mesh network device is a second destination for the second request. The processing device process the second request at a data stack of an operating system executing on the mesh network device.

In one embodiment, the request includes three pairs of addresses including a first part with a first address of a radio of the mesh network device to transmit the request and a second address of a radio of a next device to receive the request from the mesh network device; a second pair with a third address identifying a source mesh network device and a fourth address identifying a destination mesh network device; and a third pair with fifth address and a sixth address that collectively identify an end-to-end path between a source device and a destination device. In other embodiments, the request includes frame data with a first pair of receiver and transmitter addresses, a second pair of addresses that are mesh destination and source addresses, and a third pair of end-to-end destination and source addresses. In other embodiments, the request includes frame data with the following: 1) a receive radio address field to store a receive radio media access control (MAC) address that identifies a receive radio of a next-hop mesh network device to receive the frame data at the next-hop mesh network device; 2) a transmit radio address field to store a transmit radio MAC address that identifies a transmit radio of the mesh network device to transmit the frame data to the next-hop mesh network device; 3) a destination node address field to store a destination node MAC address that identifies a destination mesh network device for the frame data; 4) a source node address field to storage a source node MAC address that identifies a source mesh network device for the frame data; 5) a second destination node address field to storage the destination node MAC address; and 6) a client address field to store a client MAC address that identifies the client consumption device. The second destination node address field and the client address field reflect an end-to-end path for the frame data.

In a further embodiment, the processing device is coupled to a third radio and a fourth radio, and the processing device includes a MUL and stores a list of a node MAC address for the mesh network device and a first MAC address for the first radio, a second MAC address for the second radio, a third MAC address for the third radio, and a fourth MAC address for the fourth radio. As described herein, the node MAC address, the first MAC address, the second MAC address, the third MAC address, and the fourth MAC address are 48-bit MAC addresses. The first 45 bits of the 48-bit MAC addresses may be the same for the node MAC address, the first MAC address, the second MAC address, the third MAC address, and the fourth MAC address. The last three bits of the 48-bit MAC address may be assigned to provide unique MAC addresses for each of the node MAC address, the first MAC address, the second MAC address, the third MAC address, and the fourth MAC address.

In another embodiment, the node MAC address, the first MAC address, the second MAC address, the third MAC address, and the fourth MAC address are N-bit MAC addresses, where N is a positive integer value. A first number of bits of the N-bit MAC addresses may be fixed for the node MAC address, the first MAC address, the second MAC address, the third MAC address, and the fourth MAC address. A second number of bits of the N-bit MAC addresses may be unique for the node MAC address, the first MAC address, the second MAC address, the third MAC address, and the fourth MAC address.

In one embodiment, the frame data includes six address fields as described herein: 1) a first radio MAC address that identifies a receive radio of a next-hop mesh network device to receive the frame data at the next-hop mesh network device; 2) a second radio MAC address that identifies a transmit radio from the four radios of the mesh network device to transmit the frame data to the next-hop mesh network device; 3) a first node MAC address that identifies a destination mesh network device; 4) a second node MAC address that identifies a source mesh network device; 5) a third node MAC address that identifies a destination device; and 6) a client MAC address that identifies a client consumption device. The third node MAC address and the client MAC address may reflect an end-to-end path for the frame data. It should be noted that the third node MAC address may identify the destination mesh node as the destination device. In other embodiments, the third node MAC address may identifiers a client consumption device, such as by identifying a 2.4 GHz radio of one of the mesh network devices. In this case, the third node MAC address can be different than the first node MAC address that identifies a destination mesh network device.

FIG. 8 illustrates a multi-radio, multi-channel (MRMC) network device 800 according to one embodiment. The MRMC network 800 includes a metal housing 802 that has eight sectors 804-818. Each of the eight sectors 804-818 has a truncated pyramid structure with a top portion and four side portions that define a recessed region of the respective truncated pyramid structure. The truncated pyramid structures are disposed on their sides in a horizontal plane and arranged in a circular arraignment with two adjacent sectors sharing at least one common side portion. The truncated pyramid structure may form an octagonal prism for the metal housing 802. The top portion and the four side portions may be metal surfaces or have portions of metal. Also, the outer top surfaces of the eight sectors form an inner chamber 811 in a center of the metal housing 802. In particular, the sector 808 may be considered a reflective chamber that includes an top portion 830, a first side portion 832, a second side portion 834, a third side portion 836, and a fourth side portion 838. The other sectors 804, 806, 810, 812, 814, 816, and 818 may have similar metal portions or surfaces as reflective chambers as the sector 808. Similarly, the inner chamber 811 can be considered reflective. For example, the circuit board 811 includes a metal ground plane that is a reflective surface for the top antenna, as well as for the bottom antenna. The opposite sides of the metal surfaces of the reflective chambers also are reflective for the top and bottom antennas.

In the depicted embodiment, the MRMC network 800 includes a circuit board 820 disposed within the metal housing 802. In particular, the circuit board 820 may include multiple portions, such as a first portion disposed in the inner chamber 811. There may be a second portion of the circuit board 820 disposed within a first sector 804 and a third portion of the circuit board 820 disposed within a second sector 806. These portions may extend to an outer side of the metal housing 802. The circuit board 820 may also include smaller portions that are disposed in the other sectors 808-818 to accommodate some of the antenna pairs disposed within the respective sectors.

In the depicted embodiment, the MRMC network 800 includes eight pairs of antennas 840, each pair being disposed in one of the eight sectors 804-818. Each pair includes a horizontal orientation antenna and a vertical orientation antenna. The eight pairs of antennas 840 may be disposed on, above, or below corresponding sections of the circuit board 820. In one embodiment, each of the eight pairs of antennas 840 is a pair of cross polarized dipole antennas, a pair of vertical polarized dipole antennas, or a pair of cross polarized patch antennas.

In some embodiments, the MRMC network 800 includes a top antenna disposed on a top side of the circuit board 820 within the inner chamber 811 and a bottom antenna disposed on a bottom side of the circuit board 820 within the inner chamber 811. In the depicted embodiment, top antennas 842, 844 are disposed above the circuit board 820, and bottom antennas 846, 848 are disposed below the circuit board 820. The top antennas 842, 844 and the bottom antennas 846, 848 are helix coil antennas. In other embodiments, the top and bottom antennas may be other types of antennas, such as patch antennas, monopoles, dipoles, loops, folded monopoles, or the like.

In the depicted embodiment, the eight pairs of antennas 840, the top antennas 842, 844, and the bottom antennas 846, 848 are design to radiate electromagnetic energy in a first frequency range, such as the 5 GHz band of the Wi-Fi® technologies. The metal of the top portion and the four side portions of each of the eight sectors operate as a reflector chamber. For example, the metal of the top portion 830 and the four side portions 832-838 of the sector 808 operate as a reflector chamber for the pair of antennas 840 within the respective chamber. The reflective chamber reflects the electromagnetic energy, radiated by the horizontal orientation antenna, in a first directional radiation pattern with high gain in a direction along a center axis of the sector 808 (e.g., a truncated pyramid structure) and reflects the electromagnetic energy, radiated by the vertical orientation antenna, in a second directional radiation pattern with high gain in the direction along the center axis of the sector 808. The gain the first direction is considered higher than the gain in other directions, such as an opposite direction than the first direction. The number of metal surfaces may impact the gain in the first direction. As few as one metal surface can be used to reflect the electromagnetic energy. However, if more than three metal surfaces, the gain in the first direction can be increased.

In the depicted embodiment, the MRMC network 800 includes a first omni-directional antenna 850 (e.g., dual-band WLAN antenna) disposed on the top side of the second portion of the circuit board 820 disposed within the sector 804 (i.e., a first of the eight sectors). In a further embodiment, a second omni-directional antenna 852 is disposed on the top side of the third portion of the circuit board 820 disposed within the sector 806 (i.e., a second of the eight sectors). The first omni-directional antenna 850 and the second omni-directional antenna 852 are designed to radiate electromagnetic energy in the first frequency range (e.g., 5 GHz band) and a second frequency range (e.g., 2.4 GHz band).

In the depicted embodiment, the MRMC network 800 includes a first cellular antenna 854 (e.g., WWAN antenna) disposed on the top side of the second portion of the circuit board 820 disposed within the sector 804 (i.e., a first of the eight sectors). In a further embodiment, a second cellular antenna 856 is disposed on the top side of the third portion of the circuit board 820 disposed within the sector 806 (i.e., a second of the eight sectors). The first cellular antenna 854 and the second cellular antenna 856 are designed to radiate electromagnetic energy in a third frequency range. For examples, the third frequency range may be the 900 MHz band for the 2G specification, the 1800 MHz band for the 2G specification, the B1 band for the 3G specification, the B8 band for the 3G specification, or the B40 band for the LTE specification.

In the depicted embodiment, the MRMC network 800 includes a first RF radio (not illustrated in FIG. 8) disposed on the circuit board 820 and coupled to the first cellular antenna 854 and the second cellular antenna 856. The first RF radio causes the first cellular antenna 854, the second cellular antenna 856, or both to radiate the electromagnetic energy in the third frequency range. In a further embodiment, multiple RF radios (not illustrated in FIG. 8) are disposed on the circuit board 820 and coupled to the eight pairs of antennas 840, the top antennas 842, 844, and the bottom antennas 846, 848. The RF radios cause different combinations of one or more of the eight pairs of antennas 840, the top antennas 842, 844, and the bottom antennas 846, 848 to radiate the electromagnetic energy in the first frequency range (e.g., 2.4 GHz band). In a further embodiment, a second RF radio (not illustrated in FIG. 8) is disposed on the circuit board 820 and coupled to the first omni-directional antenna 850 and the second omni-directional antenna 852. The second RF radio cause the first omni-directional antenna 850, the second omni-directional antenna 852, or both to radiate the electromagnetic energy in the first frequency range (e.g., 5 GHz band).

In the depicted embodiment, the MRMC network 800 includes a third RF radio (not illustrated in FIG. 8) disposed on the circuit board 820 and coupled to the first omni-directional antenna 850 and the second omni-directional antenna 852. The second RF radio cause the first omni-directional antenna 850, the second omni-directional antenna 852, or both to radiate the electromagnetic energy in the second frequency range (e.g., 2.4 GHz band).

FIG. 9 is a block diagram of a network hardware device 900 according to one embodiment. The network hardware device 900 may correspond to the network hardware device 102-110 of FIG. 1. In another embodiment, the network hardware device 900 may correspond to the network hardware devices 202-210 in FIG. 2. In another embodiment, the network hardware device 900 may correspond to the mesh node 300 of FIG. 3. Alternatively, the network hardware device 900 may be other electronic devices, as described herein.

The network hardware device 900 includes one or more processor(s) 930, such as one or more CPUs, microcontrollers, field programmable gate arrays, or other types of processors. The network hardware device 900 also includes system memory 906, which may correspond to any combination of volatile and/or non-volatile storage mechanisms. The system memory 906 stores information that provides operating system component 908, various program modules 910, program data 912, and/or other components. In one embodiment, the system memory 906 stores instructions of methods to control operation of the network hardware device 900. The network hardware device 900 performs functions by using the processor(s) 930 to execute instructions provided by the system memory 906.

The network hardware device 900 also includes a data storage device 914 that may be composed of one or more types of removable storage and/or one or more types of non-removable storage. The data storage device 914 includes a computer-readable storage medium 916 on which is stored one or more sets of instructions embodying any of the methodologies or functions described herein. Instructions for the program modules 910 may reside, completely or at least partially, within the computer-readable storage medium 916, system memory 906 and/or within the processor(s) 930 during execution thereof by the network hardware device 900, the system memory 906 and the processor(s) 930 also constituting computer-readable media. The network hardware device 900 may also include one or more input devices 918 (keyboard, mouse device, specialized selection keys, etc.) and one or more output devices 920 (displays, printers, audio output mechanisms, etc.).

The network hardware device 900 further includes a modem 922 to allow the network hardware device 900 to communicate via a wireless connections (e.g., such as provided by the wireless communication system) with other computing devices, such as remote computers, an item providing system, and so forth. The modem 922 can be connected to one or more RF modules 986. The RF modules 986 may be a WLAN module, a WAN module, PAN module, GPS module, or the like. The antenna structures (antenna(s) 984, 985, 987) are coupled to the RF circuitry 983, which is coupled to the modem 922. The RF circuitry 983 may include radio front-end circuitry, antenna switching circuitry, impedance matching circuitry, or the like. The antennas 984 may be GPS antennas, NFC antennas, other WAN antennas, WLAN or PAN antennas, or the like. The modem 922 allows the network hardware device 900 to handle both voice and non-voice communications (such as communications for text messages, multimedia messages, media downloads, web browsing, etc.) with a wireless communication system. The modem 922 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Long Term Evolution (LTE) and LTE Advanced (sometimes generally referred to as 4G), etc.

The modem 922 may generate signals and send these signals to antenna(s) 984 of a first type (e.g., WLAN 5 GHz), antenna(s) 985 of a second type (e.g., WLAN 2.4 GHz), and/or antenna(s) 987 of a third type (e.g., WAN), via RF circuitry 983, and RF module(s) 986 as descried herein. Antennas 984, 985, 987 may be configured to transmit in different frequency bands and/or using different wireless communication protocols. The antennas 984, 985, 987 may be directional, omnidirectional, or non-directional antennas. In addition to sending data, antennas 984, 985, 987 may also receive data, which is sent to appropriate RF modules connected to the antennas. One of the antennas 984, 985, 987 may be any combination of the antenna structures described herein.

In one embodiment, the network hardware device 900 establishes a first connection using a first wireless communication protocol, and a second connection using a different wireless communication protocol. The first wireless connection and second wireless connection may be active concurrently, for example, if a network hardware device is receiving a media item from another network hardware device (e.g., a mini-POP node) via the first connection) and transferring a file to another user device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna. In other embodiments, the first wireless connection may be associated with content distribution within mesh nodes of the WMN and the second wireless connection may be associated with serving a content file to a client consumption device, as described herein.

Though a modem 922 is shown to control transmission and reception via antenna (984, 985, 987), the network hardware device 900 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A mesh network device comprising:
a first radio, a second radio, a third radio, and a fourth radio; and
an application processor coupled to the first radio, the second radio, the third radio, and the fourth radio, wherein the application processor comprises an software interface layer for routing data traffic to and from each of the first, the second, the third, and the fourth radios and an operating system data stack, wherein the software interface layer is assigned a node media access control (MAC) address, wherein the first radio is associated with a first MAC address, the second radio is associated with a second MAC address, the third radio is associated with a third MAC address and the fourth radio is associated with a fourth MAC address, wherein the software interface layer is operable to:
  receive a first local routing table from the first radio, the first local routing table comprising a fifth MAC address of a second mesh network device and a first performance metric of a first path between the mesh network device and the second mesh network device using the first radio;
  receive a second local routing table from the second radio, the second local routing table comprising the fifth MAC address of the second mesh network device and a second performance metric of a second path between the mesh network device and the second mesh network device using the second radio;
  receive a third local routing table from the third radio, the third local routing table comprising the fifth MAC address of the second mesh network device and a third performance metric of a third path between the mesh network device and the second mesh network device using the third radio; and
  receive a fourth local routing table from the fourth radio, the fourth local routing table comprising the fifth MAC address of the second mesh network device and a fourth performance metric of a fourth path between the mesh network device and the second mesh network device using the fourth radio;
  generate a master routing table, wherein a first entry of the master routing table comprises the fifth MAC address, a first radio identifier of the second radio, and the second performance metric, wherein a second entry of the master routing table comprises the fifth MAC address, a second radio identifier of the third radio, and the third performance metric; and
  receive a request comprising first frame data, the request including the fifth MAC address of the second mesh network device as a destination for the request;
  determine, using the second performance metric and the third performance metric in the master routing table, that the third path for routing the first frame data to the second mesh network device via the third radio has a higher priority than the second path for routing the first frame data to the second mesh network via second radio;
  select the second radio identifier corresponding to the third path given the higher priority; and forward the first frame data to the third radio using the second radio identifier, the third radio to determine, using the second local routing table, a MAC address of a radio of a next-hop mesh network device in the third path to send the first frame data to the second mesh network device.

2. The mesh network device of claim 1, further comprising a fifth radio coupled to the processor, wherein the application processor is to:
receive an application layer protocol request, comprising the first frame data, from a client consumption device via the fifth radio, wherein the application layer protocol request includes a client MAC address for the client consumption device and the first frame data includes the fifth MAC address of the second mesh network device as a destination for the request;
determine the second radio to transmit the first frame data to the second mesh network device by looking up the entry in the master routing table;
forward the first frame data to the second radio, wherein the second radio is to:
determine a radio of a next-hop mesh network device to send the first frame data by looking up an entry in the second routing table stored at the second radio, the entry in the second routing table comprising a receiver MAC address of the radio of the next-hop mesh network device in the path to the second mesh network device;
include the receiver MAC address for the radio of the next-hop mesh network device in the first frame data; and
transmit the first frame data to the radio of the next-hop mesh network device.

3. The mesh network device of claim 1, further comprising a fifth radio coupled to the processor, wherein the application processor is to:
receive a second frame data from the first radio, the second frame data including the fifth MAC address of the second mesh network device as a destination for the request, wherein the software interface layer is to:
determine the second radio to transmit the second frame data to the second mesh network device by looking up the entry in the master routing table, wherein the second frame data comprises a transmitter MAC address for the second radio, a node MAC address for a source node mesh network device, a node MAC address for the second mesh network device, and a client MAC address of a client consumption device;
forward the second frame data to the second radio, wherein the second radio is to:
determine a radio of a next-hop mesh network device to send the second frame data by looking up the entry in the second routing table stored at the second radio, the entry in the second routing table comprising a receiver MAC address of the radio of the next-hop mesh network device in the path to the second mesh network device;
include the receiver MAC address for the radio of the next-hop mesh network device in the second frame data; and
transmit the second frame data to the radio of the next-hop mesh network device.

4. The mesh network device of claim 1, further comprising a fifth radio coupled to the processor, wherein the application processor is to:
receive third frame data from the first radio, the third frame data including the fifth MAC address of the second mesh network device as a destination for the request, wherein the software interface layer is to:
match the node MAC address of the mesh network device to the fifth MAC address in the third frame data in the master routing table; and
forward the third frame data to a data stack of an operating system of the mesh network device.

5. A mesh network device comprising:
a first radio;
a second radio;
a third radio;
memory; and
a processing device coupled to the first radio, the second radio, and the third radio, and the memory, wherein the processing device is to:
receive a request for digital content from a client consumption device via the first radio;
determine that a second mesh network device is a destination for the request;
determine, using a first routing table stored in the memory, that the second radio is to transmit the request to the second mesh network device, the first routing table comprising information about the second radio and the third radio, wherein the information comprises metrics that identifies a higher priority path to the second mesh network device via the second radio than a path to the second mesh network device via the third radio, wherein the information about the second radio is received from the second radio and the information about the third radio is received from the third radio,
wherein the second radio is to:
determine, using a second routing table stored at the second radio, that the request is to be transmitted to a first radio of a third mesh network device that is communicatively coupled to the second mesh network device, wherein the third mesh network device is along a first communication path between the first and the second mesh network devices, and wherein the second routing table includes an entry with an address of the first radio of the third mesh network device and the address of the second mesh network device, and wherein the first routing table does not include the address of the first radio of the third mesh network device or the address of the second mesh network device; and
send the request to the first radio of the third mesh network device.

6. The mesh network device of claim 5, further comprising a third radio coupled to the processing device and wherein the processing device is to:
receive a second request from a fourth mesh network device via the second radio;
determine that a fifth mesh network device is a destination for the second request;
determine, using the first routing table, that the third radio is to transmit the second request;
wherein the third radio is to:
determine, using a third routing table stored at the third radio, that the second request is to be communicated to a radio of a sixth mesh network device, the sixth mesh network device being the next device along a second communication path between the fourth mesh network device and the fifth mesh network device; and
send the second request to the radio of the sixth mesh network device.

7. The mesh network device of claim 5, further comprising a third radio coupled to the processing device, and wherein the processing device is to:
  receive a second request from a fourth mesh network device via the second radio;
  determine that a fifth mesh network device is a second destination for the second request;
  determine, using the first routing table, that the third radio is to transmit the second request;
  wherein the third radio is to:
    determine, using a third routing table stored at the third radio, that the second request is to be communicated to a radio of the fifth mesh network device, the fifth mesh network device being the next device along a second communication path between the fourth mesh network device and the fifth mesh network device; and
    send the request to the radio of the fifth mesh network device.

8. The mesh network device of claim 5, further comprising a third radio coupled to the processing device, wherein the processing device is to:
  receive a second request from a fourth mesh network device via the second radio determine that the mesh network device is a second destination for the second request; and
  process the second request at a data stack of an operating system executing on the mesh network device.

9. The mesh network device of claim 5, wherein the request comprises:
  a first pair of addresses comprising a first address of a radio of the mesh network device to transmit the request and a second address of a radio of a next device to receive the request from the mesh network device;
  a second pair of addresses comprising a third address identifying a source of the request and a fourth address identifying a destination of the request; and
  a third pair of addresses comprising a fifth address and a sixth address that collectively identify an end-to-end path between a source device and a destination device.

10. The mesh network device of claim 5, wherein the request comprises a frame comprising:
  a receive radio media access control (MAC) address that identifies a receive radio of a next-hop mesh network device to receive the frame at the next-hop mesh network device;
  a transmit radio MAC address that identifies a transmit radio of the mesh network device to transmit the frame to the next-hop mesh network device;
  a destination node MAC address that identifies a destination mesh network device for the frame;
  a source node MAC address that identifies a source mesh network device for the frame; and
  a destination device address; and
  a client MAC address that identifies the client consumption device, wherein the destination device address and the client MAC address reflect an end-to-end path for the frame.

11. The mesh network device of claim 10, further comprising:
  a third radio coupled to the processing device; and
  a fourth radio coupled to the processing device, wherein the processing device comprises a software interface layer, and wherein the processing device is to
  store a list of a node MAC address for the mesh network device and a first MAC address for the first radio, a second MAC address for the second radio, a third MAC address for the third radio, and a fourth MAC address for the fourth radio.

12. The mesh network device of claim 11, wherein the node MAC address, the first MAC address, the second MAC address, the third MAC address, and the fourth MAC address are 48-bit MAC addresses, wherein the first 45 bits of the 48-bit MAC addresses are the same for the node MAC address, the first MAC address, the second MAC address, the third MAC address, and the fourth MAC address, and wherein the last three bits of the 48-bit MAC addresses are unique for each of the first MAC address, the second MAC address, the third MAC address, and the fourth MAC address.

13. A mesh network device comprising:
  a first radio;
  a second radio;
  memory; and
  a processing device coupled to the first radio, the second radio, and the memory, wherein the processing device is to:
    store a list comprising a node MAC address for the mesh network device, a first MAC address for the first radio, and a second MAC address for the second radio;
    receive a request for digital content from a client consumption device via the first radio;
    transmit, using a first routing table stored in the memory, the request to a second mesh network device, the first routing table including information identifying a higher priority path to the second mesh network device than other paths to the second mesh network device,
  wherein the second radio is to:
    determine, using a second routing table stored at the second radio, that the request is to be transmitted to a first radio of a third mesh network device that is communicatively coupled to the second mesh network device, wherein the third mesh network device is along a first communication path between the first and the second mesh network devices, and wherein the second routing table includes an entry with an address of the first radio of the third mesh network device and the address of the second mesh network device; and
    send the request to the first radio of the third mesh network device, wherein the node MAC address, the first MAC address, and the second MAC address are N-bit MAC addresses, where N is a positive integer value, wherein a first number of bits of the N-bit MAC addresses are fixed for the node MAC address, the first MAC address, and the second MAC address, and wherein a second number of bits of the N-bit MAC addresses are unique for the node MAC address, the first MAC address, and the second MAC address.

14. The mesh network device of claim 5, wherein the request comprises a frame, wherein the frame comprises six addresses fields comprising:
  a first radio MAC address that identifies a receive radio of a next-hop mesh network device to receive the frame at the next-hop mesh network device;
  a second radio MAC address that identifies a transmit radio to transmit the frame to the next-hop mesh network device;
  a first node MAC address that identifies a destination mesh network device;

a second node MAC address that identifies a source mesh network device;

a third node MAC address that identifies a destination device; and a client MAC address that identifies a client consumption device, wherein the third node MAC address and the client MAC address reflect an end-to-end path for the frame.

15. A method comprising:

receiving, by a processing device of a mesh network device, a request from a client consumption device for digital content over a first link between a radio of the client consumption device and a first radio of the mesh network device;

determining, by the processing device, that a second mesh network device is a destination of the request;

determining, by the processing device, that a second radio coupled to the processing device corresponds to a first communication path to the second mesh network device using a first routing table stored in memory communicatively coupled to the processing device, the first routing table comprising information about the second radio and a third radio, the information identifying the first communication path as having a higher priority than a second communication path to the second mesh network device via the third radio, wherein the information about the second radio is received from the second radio and the information about the third radio is received from the third radio;

determining, using a second routing table stored at the second radio, that the request is to be transmitted to a radio of a third mesh network device over a second link between the second radio and the radio of the third mesh network device, the third mesh network device being a next device in the first communication path between the client consumption device and the second mesh network device; and sending, by the second radio, the request to the radio of the third mesh network device.

16. The method of claim 15, further comprising:

receiving a second request from a fourth mesh network device via the second radio of the mesh network device;

determining, by the processing device, that a fifth mesh network device is a second destination for the second request;

determining, by the processing device, that the third radio is to transmit the second request using the first routing table stored in the memory;

determining, using a third routing table stored at the third radio, that the second request is to be transmitted to a radio of a sixth mesh network device over a third link between the third radio and the radio of the sixth mesh network device, the sixth mesh network device being the next device along a second communication path between the fourth mesh network device and the fifth mesh network device; and sending, by the third radio, the second request to the radio of the sixth mesh network device.

17. The method of claim 15, further comprising:

receiving a second request from a fourth mesh network device via the second radio of the mesh network device;

determining, by the processing device, that a fifth mesh network device is a second destination for the second request;

determining, by the processing device, that the third radio is to transmit the second request using the first routing table stored in memory;

determining, using a third routing table stored at the third radio, that that the second request is to be transmitted to a radio of the fifth mesh network device over a third link between the third radio and the radio of the fifth mesh network device, the fifth mesh network device being the next device along a second communication path between the fourth mesh network device and the fifth mesh network device; and sending the request to the radio of the fifth mesh network device.

18. The method of claim 15, further comprising:

receiving a second request from a fourth mesh network device via the second radio of the mesh network device;

determining, by the processing device, that the mesh network device is a second destination for the second request; and processing, by the processing device, the second request at a data stack of an operating system executing on the mesh network device.

19. The method of claim 15, wherein the request is an application layer protocol request, and wherein the sending, by the second radio, the request to the radio of the third mesh network device comprises sending a frame comprising six addresses for routing.

20. The method of claim 19, wherein the six addresses are:

a first radio MAC address that identifies a receive radio of a next-hop mesh network device to receive the frame at the next-hop mesh network device;

a second radio MAC address that identifies a transmit radio of the mesh network device to transmit the frame to the next-hop mesh network device;

a first node MAC address that identifies a destination mesh network device;

a second node MAC address that identifies a source mesh network device;

a third node MAC address that identifies the destination mesh network device; and a client MAC address that identifies a client consumption device, wherein the third node MAC address and the client MAC address reflect an end-to-end path for the frame.

* * * * *